United States Patent [19]
Ciscon et al.

[11] Patent Number: 5,812,779
[45] Date of Patent: *Sep. 22, 1998

[54] STORAGE MEDIUM AND SYSTEM FOR MANAGING AND DISTRIBUTING DATA OBJECTS OF DIFFERENT TYPES BETWEEN COMPUTERS CONNECTED TO A NETWORK

[75] Inventors: Larry A. Ciscon; James D. Wise, Jr.; Don H. Johnson, all of Houston, Tex.

[73] Assignee: Modulus Technologies, Inc., Houston, Tex.

[ * ] Notice: The term of this patent shall not extend beyond the expiration date of Pat. No. 5,634,010.

[21] Appl. No.: 803,867

[22] Filed: Feb. 24, 1997

Related U.S. Application Data

[63] Continuation of Ser. No. 327,019, Oct. 21, 1994, Pat. No. 5,634,010.

[51] Int. Cl.$^6$ ..................................................... G06F 13/00
[52] U.S. Cl. ................................ 395/200.53; 395/200.68; 395/683; 707/10
[58] Field of Search ........................ 707/10; 395/200.53, 395/200.68

[56] References Cited

U.S. PATENT DOCUMENTS

| | | | |
|---|---|---|---|
| 4,644,468 | 2/1987 | Doster et al. ......................... | 395/200.5 |
| 4,941,084 | 7/1990 | Terada et al. ............................ | 395/684 |
| 5,224,205 | 6/1993 | Dinkin et al. ....................... | 395/200.56 |
| 5,241,682 | 8/1993 | Bryant et al. ....................... | 395/200.79 |
| 5,341,496 | 8/1994 | Middledorp et al. .................... | 395/181 |
| 5,522,042 | 5/1996 | Fee et al. ............................ | 395/200.56 |
| 5,634,010 | 5/1997 | Cisson et al. ....................... | 395/200.53 |

*Primary Examiner*—Thomas G. Black
*Assistant Examiner*—Hosain T. Alam
*Attorney, Agent, or Firm*—Conley, Rose & Tayon

[57] ABSTRACT

A data management and distribution system has been described that includes router processes for controlling data communications between child processes running on computers connected by a network. Preferably, a router process runs on each computer, with the application processes running on the computer connected directly to the router process. As a result, all interprocess communications must pass through the routers. Each router process includes a connection table listing its connections with all other router and application processes, as well as an interest table listing the type of objects that each of the other processes are interested in receiving. Data communication is accomplished by an application process providing an object to its local router, which then distributes the object to all other interested routers. The object includes a destination list indicating which processes are to receive the object. Thus, with the use of routers, application processes that need to communicate with each other over a network need not know the intricate details (such as the communications protocol used, the exact address of the receiving process, etc.) involved in transmitting information. By placing the burden of managing the network communications on the local routers, the complexity of the application code is reduced since it has only a single connection to its local router.

44 Claims, 12 Drawing Sheets

STORAGE MEDIUM AND SYSTEM FOR MANAGING AND DISTRIBUTING DATA OBJECTS OF DIFFERENT TYPES BETWEEN COMPUTERS CONNECTED TO A NETWORK

This is a Continuation of application Ser. No. 08/327,019 filed Oct. 21, 1994 and now U.S. Pat. No. 5,634,010.

BACKGROUND OF THE INVENTION

1. Field of the Invention

The invention relates to managing communications in a computer network, and more particularly, to a data management and distribution system for providing a virtual fully-connected network between processes running on the computers.

2. Description of the Related Art

The dramatic growth of network-based environments and the accompanying movement of organizations to client/server in distributed computing environments have created an intense need for tools and technologies that support the development and management of resources and applications in these environments. Dramatic improvements in connectivity and communications hardware have made distance between network components increasingly irrelevant. A large number of computers used today are connected to some form of network environment. Increasingly, these networks include heterogeneous components, including diverse hardware platforms and operating systems which, in turn, are often interconnected by more than one network protocol.

To take advantage of the network-based environment, software applications are being developed with a more distributed model in mind; that is, the software applications are broken up into distinct processes and run on different processors in the network enviroment. However, currently developed distributed applications which take full advantage of the business and technology opportunities of large heterogenous networks have been prohibitively costly and complex. The dilemma is that even though distributed applications are best suited for effectively utilizing networked environments, they are significantly more difficult to write than more traditional centralized applications. In addition to the applications specific portions of the software, developers must also deal with asynchronous data transfers, communications protocols, data consistency issues, detection and correction of communications errors, data queuing and other problems associated with transferring information between the independent pieces of the application. As an additional complication, managing the distributed applications once they have been developed is also quite difficult in a highly diverse network environment where a change in one component can have a dramatic ripple effect on many other elements in the network. As a result, in order to develop and manage distributed computing applications, companies typically must invest not only in the wide variety of software tools, but must also become dependent on a wide range of specialists who understand the low level intricacies of many different operating systems and network protocols. This often results in more time being spent on technical design issues, rather than business design issues, in the development of distributed applications.

To minimize the complexity, most existing distributed computing applications and tools are based upon the client/server model of distributed processing. The client/server model deals with the network complexities by accepting an up front design limitation which mandates a single connection between two processes. For example, FIG. 1A shows a "standard" client/server system, which contains a single server 100 and multiple clients 102, 104 and 106 interacting with the server 100. An example of such a system could be a large company which stores its inventory and customer databases on a high performance computer system acting as a data server which is accessed by various personal computers over the network. As seen from FIG. 1A, the server 100 is individually connected to each of the clients 102, 104 and 106.

A more complex system is shown in FIG. 1B. In this configuration, the database is distributed over multiple servers 110, 112 and 114, which interact with clients 102, 104 and 106. This configuration exists in a situation where data is collected at various different sites, or where one network from one company is interconnected to a different network in another company in order to electronically exchange information. Expanding the client/server system to contain multiple servers interacting with multiple clients, however, causes the complexity of the system to increase exponentially. The added complexity is due to the overhead involved in maintaining all the necessary connections. For example, a system which contains three servers connected to three clients must maintain a total of 11 connections. Even in a homogeneous environment where all the platforms are identical, each platform runs the same operating system, and only one network protocol is used, the complexity of large client/server configurations is immense. When the network becomes heterogeneous, the development and management problems become staggering.

SUMMARY OF THE INVENTION

As a result, it is an object of the present invention to provide a data management and distribution system that reduces the complexities of using distributed applications in a complex network. The data management and distribution system according to the present invention provides a "virtual" fully-connected network while avoiding the complexities of such a fully-connected network. The system utilizes a "data-centered" approach for distributing data among different processes in a network of computer systems. In the data-centered approach according to the preferred embodiment of the present invention, data is distributed as an encapsulated object. Each object includes a time stamp, properties, and addressing information in addition to the underlying data itself. Additionally, application processes running on the computers indicate the type of objects they are sending or are interested in receiving. The data management and distribution system includes local router processes that preferably run on each of the computers for managing the transfer of these objects. Application processes running on the computers are connected to their respective local routers. Effectively, each local router acts as an interface between its respective application processes and the other routers. Each application process registers its interest in receiving certain types of objects with its local router. The local router then propagates this interest to other routers in the network so that the routers are aware of each other's interests. Each local router has a connection table for keeping track of the routers that the local router is connected to. The connection table also maintains a list of the child processes connected to the local router. In addition, each local router includes an interest table which lists the interests of its child processes as well as the interests of the other local routers. Data communication is accomplished by an application process providing an object to its local router, which then distributes the object to all other interested routers of which it is aware. Thus, with the use of local routers, application processes that need to communicate with each other over a network need not know the intricate details (such as the communications protocol used, the exact address of the receiving process, etc.) involved in transmitting information. By placing the burden of managing the network communications on the local routers, the complexity of the application code is reduced since it has only a single connection to its local router. Such details as the operating system type and the network protocol used are handled by the routers. Another advantage of the present invention is that, since each local router is aware of each other's interests, a virtual fully-connected network is available while avoiding the complexities of such a fully-connected network. A further advantage of the present invention is that what is defined as a client or a server can change dynamically, whereas in prior designs, the client and server components must be defined early in the design process. Yet another advantage of the present invention is that the routers can be used with different operating systems and communications protocols, thereby allowing it to be used in a heterogeneous network.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1A:
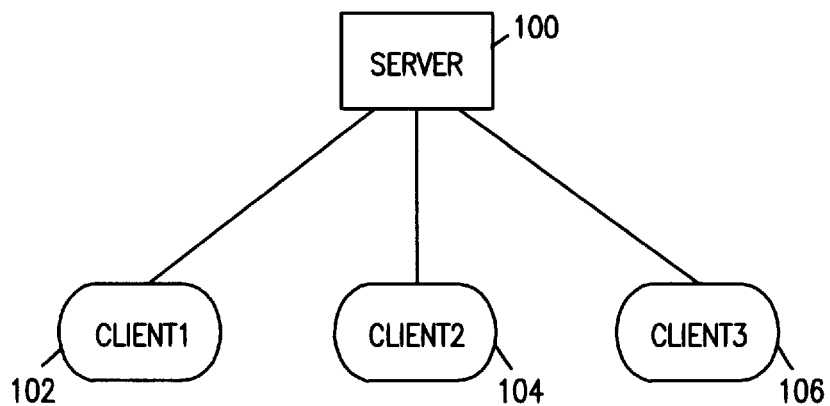
FIGS. 1A and 1B are block diagrams of exemplary client/server networks.
Figure 1B:
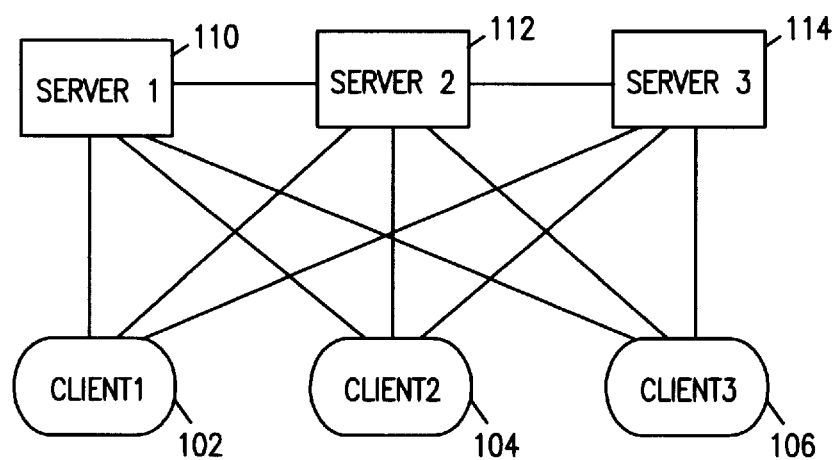
Figure 2A:
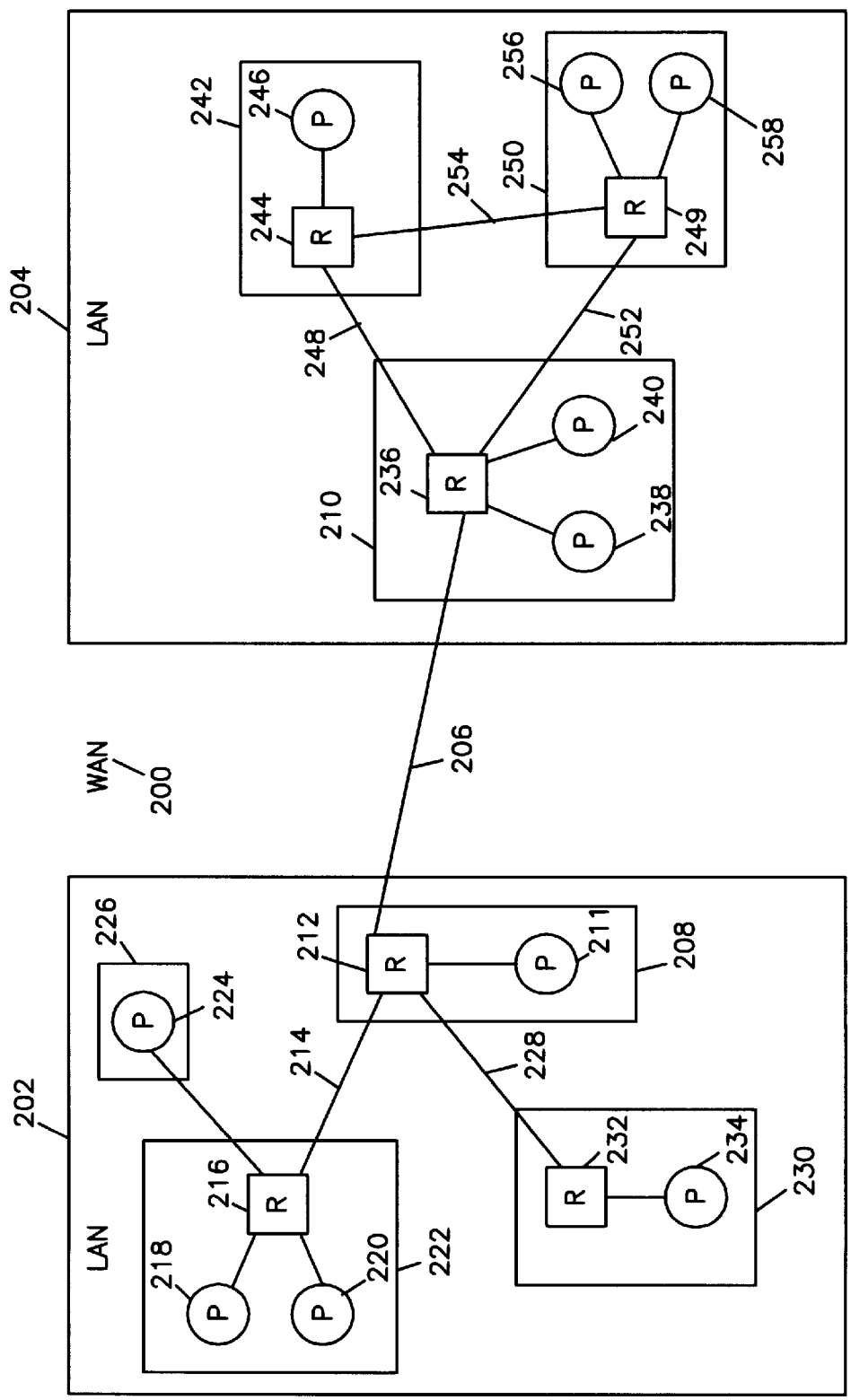
FIG. 2A is a block diagram of an exemplary wide area network incorporating the preferred embodiment of the present invention.

Referring now to FIG. 2, an exemplary wide area network (WAN) 200 incorporating the preferred embodiment of the present invention is shown. The wide area network 200 comprises a first local area network (LAN) 202 connected to a second LAN 204 via a connection 206. As an example, the first LAN 202 could be located in one city and the second LAN 204 could be located in another city, with the connection 206 being a remote connection, such as a 56 kbps dial-up line or T1 connection and so forth, as well known in WAN deployment. The connection 206 is connected between a computer 208 in the first LAN 202, and a computer 210 in the second LAN 204. Each of the computers 208 and 210 includes a modem or other appropriate interface for performing data transmission.

A router process 212 and an application process 211 run on the computer 208. Depending upon the capability of the computer 208, additional processes may be started at a later time. The router 212 according to the preferred embodiment is capable of being compiled to run in a variety of different operating systems, such as SunOS, HP-UX, IBM AIX, Windows, DOS, Protected Mode DOS, OS/2, Silicon Graphics Unix and Sun Solaris. The computer 208 is connected to a computer 222 through a connection 214. Another router 216 runs on the computer 222. Data transmissions between processes on the computer 208 and processes on the computer 222 are handled by the routers 212 and 216. Two application processes 218 and 220 are shown running on the computer 222. Schematically, each of the processes 218 and 220 is directly connected to the router 216. Thus, the router 216 handles communications between the process 218 and the process 220, as well as communications between either process 218 or 220 and the process 211 running on the computer 208. In the description that follows, connections between the application processes and their local router are referred to as private connections and connections between routers are referred to as public connections.

The router 216 is also connected to a process 224 running on another computer 226. The operating system running on the computer 226 is DOS, for example, and as a result, the computer 226 is unable to run both a router process and an application process since DOS is not a multi-tasking operating system, it being able to run only one process at a time. As a result, the router 216 is connected to the process 224 to handle data communications between the process 224 and the other processes in the LAN 202. It is noted that, in general, it is always possible to run a process "slaved" off another machine's process.

The computer 208 is also connected to another computer 230 via a connection 228. A router process 232 and an application process 234 run on the computer 230. Data transferred over the connection 228 are managed by routers 212 and 232. Thus, in the LAN 202, the burden of managing communications between the various processes are placed on the routers 212, 216 and 232, thereby reducing dramatically the complexity of the application codes. The routers 212, 216 and 232 preferably include separate drivers for managing the transfer of data through TCP/IP sockets, serial connections, Netware, shared memory, SLIP, PPP, and other standard computer networks and protocols. The router drivers interface with standard drivers provided with the operating system to perform the actual data exchange. Each router is aware of the particular driver necessary for each of its direct connections and thus loads the appropriate drivers when the router is loaded.

The routers according to the preferred embodiment use a "data-centered" approach for distributing data among the processes. In the data-centered approach, processes indicate the type of data they are sending or are interested in receiving. In contrast, other systems are usually process (or address) centered, in which two processes that wish to send and receive data need to know each other's addresses (or process IDs, etc.), which tends to add to the complexity of the data distribution system as the number of processes running in the network increases. Since the routers utilize a data-centered approach, the organization of the data must be consistent among all the processes. Thus, a structure for the data is defined, with the structure of data being transferred between two processes along with other information. The other information are referred to as properties, which provide additional information about the data, including which process created it, the time it was created, and information to differentiate each structure from other structures. In the ensuing text, the combination of the structure of data and its associated properties is referred to as a data object. Data objects thus form the fundamental unit of exchange between the routers 212, 216 and 232.

Each data object has an associated type identifier value that uniquely determines which data structure is associated with the given object. The type identifier is a unique number that allows the processes and the routers to identify exactly which type of data structure the object contains. The data objects also contain several properties that provide additional information about the object, including when it was created, when it was distributed, the attributes of the data, and other characteristics. Finally, fields defining the structure of the data to be transferred are included in the data object. These fields could be variable length fields for defining an array of structures in which the number of elements of the array can be dynamically changed. The data objects can also contain fields that point to structures or other objects, thereby allowing creation of complex objects containing linked lists, tree structures, etc. When a data object is sent to another process by a local router, the local router follows all pointer fields and send copies of the data pointed to. Additionally, a variable type field can be used to indicate a field, or a pointer to a field, where the type of the field is not known beforehand.

Figure 11:
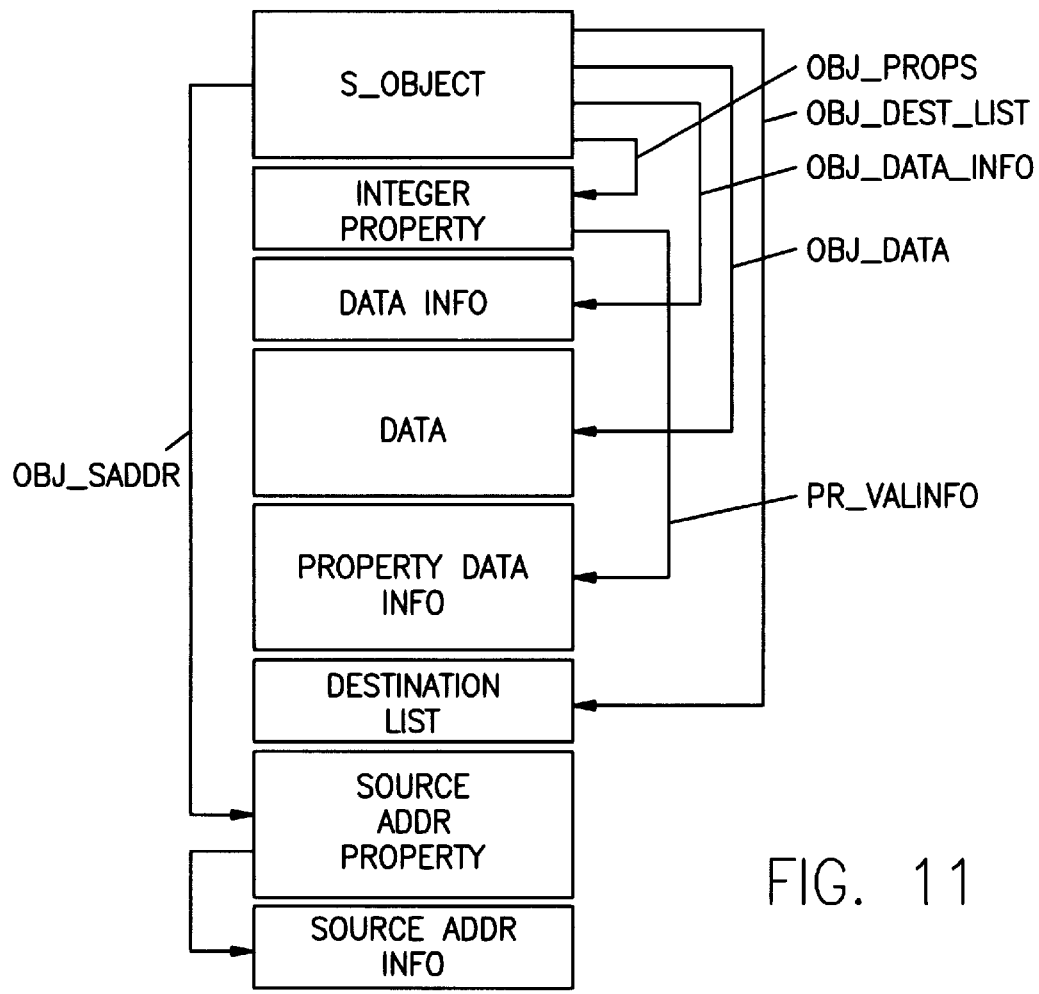
FIG. 11 is a block diagram of a data object.

An example of a data object S_OBJECT is provided in FIG. 11, which shows a block representation of the data object S_OBJECT. The exemplary data object S_OBJECT contains various pointers, and is defined preferably as follows:

```
STRUCTURE S_OBJECT {
    UINT4           TGL_SIZE;
    S_TYPE          VIDEO;
    UINT2           TGL_FLAGS;
    UINT2           TGL_DUMMY;
    S_PTRFIELD      OBJ_DATA_INFO;
    S_PTR           OBJ_DATA;
    S_PROPERTY      OBJ_PROPS;
    S_PROPERTY      OBJ_SADDR
    S_DEST          OBJ_DEST_LIST;
}
```

The field type UINT2 indicates a 2-byte unsigned integer and the field type UINT4 indicates a 4-byte unsigned integer. The field S_TYPE indicates the object type, which in this case has the value represented as VIDEO. The value TGL_SIZE represents the size of the object, and TGL_FLAGS and TGL_DUMMY are various flags and a dummy variable, respectively. The field S_PTR defines a pointer OBJ_DATA to a location for storing the data. The field S_PTRFIELD defines a pointer OBJ_PTR_INFO to a location for storing attributes of the data, one of the attributes being the size of the data. There are two S_PROPERTY fields, one defining a pointer OBJ_PROPS to a structure for storing the integer properties of the object S_OBJECT, and the other defining a pointer OBJ_SADDR to a structure for storing a source address property. Finally, the field S_DEST defines a pointer OBJ_DEST_LIST to a structure for storing a list of target processes.

An exemplary structure S_PROPERTY containing the integer properties is defined as

```
STRUCTURE S_PROPERTY {
    P_TYPE  INTEGER
    S_PTRFIELD      PR_VALINFO
    S_PROPS
{
            #DEFINE     COMPRESSED      0x01
            #DEFINE     UNCOMPRESSED    0x02
            .
            .
            .
    }
}
```

The field P_TYPE defines the type INTEGER of the property structure, and the field S_PROPS defines a list of property data of the current data object. For example, two integer variables COMPRESSED and UNCOMPRESSED are defined for use in a video application. The field S_PTRFIELD defines a pointer PR_VALINFO to a location for indicating various attributes of the property data in the field S_PROPS, such as the size of the property data.

An exemplary source address property structure is defined as

```
STRUCTURE S_PROPERTY
    P_TYPE          SOURCE_ADDRESS
    S_PTRFIELD      PR_SADDRINFO
    S_ADDRESS       SADDR
}
```

The field P_TYPE defines the type SOURCE_ADDRESS of the property structure, and the field S_ADDRESS defines a pointer SADDR to a structure containing the source address. A value DEST_ADDRESS can be used instead in the P_TYPE field to indicate that the address is a destination address. The field S_PTRFIELD defines a pointer PR_SADDRINFO to a location for indicating various attributes of the address information. An exemplary address structure S_ADDRESS is defined as follows:

```
STRUCTURE S_ADDRESS  {
    UINT4               TGL_SIZE;
    S_DOMAIN            D_MAP;
    VARIABLE S_DOMINFO  DINFO;
}
```

The value TGL_SIZE specifies the size of the address structure S_ADDRESS. The field S_DOMAIN defines a map D_MAP, and the field S_DOMINFO defines a domain DINFO. The domain field is declared as variable as the number of domains specified in an address are variable. Maps and domains in an address are described below.

An exemplary destination structure S_DEST is defined as

```
STRUCTURE S_DEST  {
    UINT4           TGL_SIZE
    S_DESTINFO  {
        S_HOSTINFO      [0xA,0X1]
        S_HOSTINFO      [0xB,0X5]
        .
        .
        .
    }
}
```

The size of the destination structure S_DEST is represented as TGL_SIZE and the field S_DESTINFO defines a list of processes that are to receive the data object. The value represented by [X,Y] corresponds to the host ID of a target router process. The host ID of a router process is created by the router process during startup, and can be any arbitrary unique identifier having a predetermined fixed length.

Two important concepts in addressing for the data distribution system according to the present invention are domains and maps. Several maps may be defined simultaneously, with each map representing different groupings of processes or interests. Each map represents a different conceptualization of the overall data distribution environment. An analogy can be drawn between these conceptual maps and the concept of different geographical maps showing political boundaries, geographic boundaries, or economic boundaries, where a particular region is divided differently depending upon the objective of the mapping scheme. Within each map, processes are arranged into domains. Domains provide a convenient mechanism for grouping of applications, similar to the way files are grouped together in a directory tree. Each domain may contain one or more subdomains. Additionally, an application process may be assigned to two or more domains. A domain can also include applications running on different computers.

The data management and distribution system according to the preferred embodiment includes a PHYSICAL map which defines the connections between the applications and routers. Domains in the PHYSICAL map correspond to physical processes. In addition, depending on how an applications programmer determines how application processes are to communicate with one another, different maps can be specified by the programmer. For example, an ACCT_SYS map may be specified in which processes are separated into a WESTCOAST domain and an EASTCOAST domain. Thus, at startup, when specific physical addresses of other processes are not known to each application process, the application processes in the system are able to communicate via the ACCT_SYS map. However, as data objects, which contain the physical address of the application process sending the data object, are exchanged between processes, more specific physical addresses in the form of PHYSICAL:DOMAIN1:DOMAIN2 are then known to the application processes. By placing these physical addresses as part of the address property in each data object, more specific targeting of data objects can be accomplished. It is noted that although a physical address unique to a process can be specified as an address property in the transmitted data object for more specific targeting, a more general domain address can be used instead.

The physical address of a router or application process is created by the router or application process during startup. It typically includes the map PHYSICAL followed by a domain [host ID] and a domain [process ID], that is, PHYSICAL:[host ID]:[process ID]. In this way, each application process is assigned a unique physical address. The host ID is typically determined by the computer system on which the router or application process is running, and the process ID is determined by the type of process running, although any arbitrary scheme could be utilized as desired.

The advantage of the addressing scheme of the data management and distribution system according to the preferred embodiment is that the applications programmer need not worry about the physical connections of the different processes. Instead, the applications programmer can specify some general mapping scheme for initial communications between processes. After that, through the exchange of data objects, each application process becomes aware of the other's physical address and more specific targeting of data objects can be accomplished.

Figure 3:
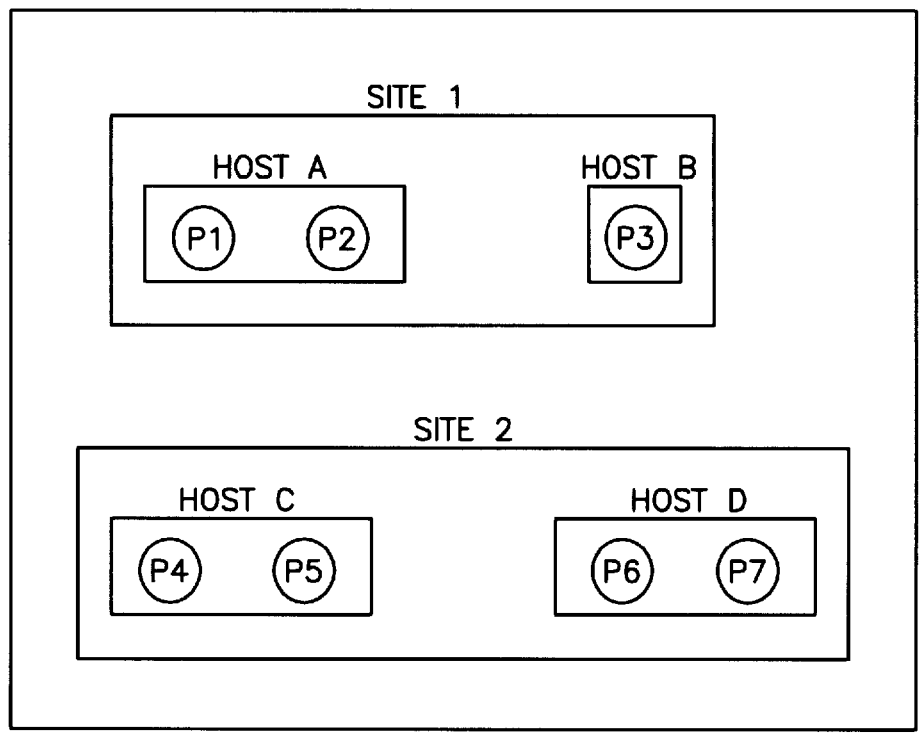
FIG. 3 is a exemplary diagram of the addressing scheme used in the preferred embodiment.
Figure 3:
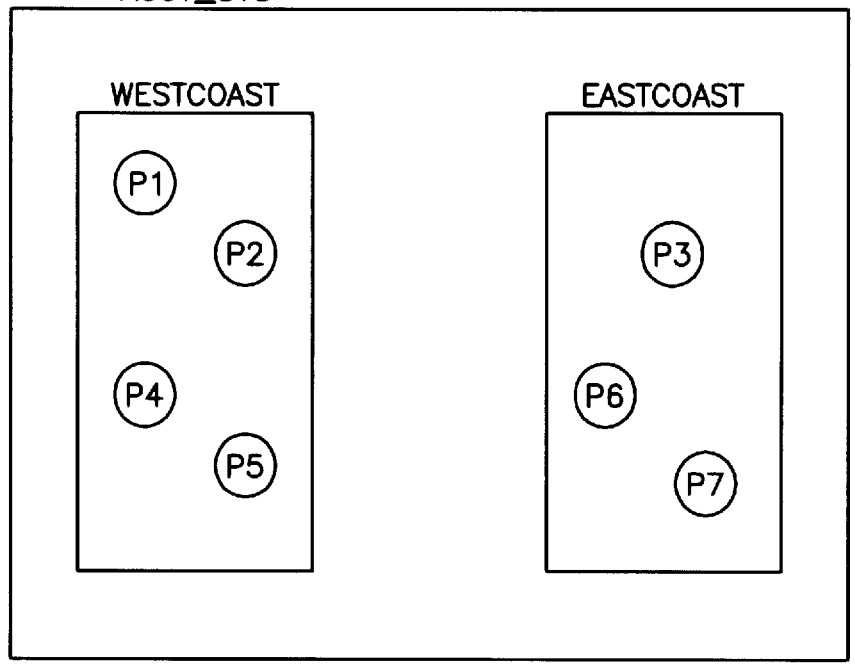

A complete address consists of the map for the address, and a full path from the top level domain to the required subdomain. Also, any domain in the address may also be specified using a wild card. Thus, referring to FIG. 3, an exemplary addressing scheme is shown which includes a PHYSICAL map and an ACCT_SYS map. The symbol ":" indicates an AND function and the symbol "^" indicates an OR function. In the ACCT_SYS map, processes P1, P2, P4 and P5 can be generally addressed in the address property of a data object by specifying the domain address ACCT_SYS:WESTCOAST. Similarly, processes P3, P6 and P7 can be specified by the domain address ACCT_SYS:EASTCOAST. In the PHYSICAL map, processes P1, P2, P3, P4, P5, P6 and P7 have the domain addresses PHYSICAL:[SITE 1]:[HOST A]:[P1], PHYSICAL:[SITE 1]:[HOST A]:[P2], PHYSICAL:[SITE 1]:[HOST B]:[P3], PHYSICAL:[SITE 2]:[HOST C]:[P4], PHYSICAL:[SITE 2]:[HOST C]:[P5], PHYSICAL:[SITE 2]:[HOST D]:[P6] and PHYSICAL:[SITE 2]:[HOST D]:[P7], respectively. To target addresses P1 and P2, the domain address PHYSICAL:[SITE 1]:[HOST A]:* is specified.

Addressing information can be specified both when an object is distributed and when a process registers interest in an object. A destination address of an object is the address of the process that should receive it. By specifying a destination address when the object is distributed, the object is directed specifically to that address. By specifying a source address when a process registers interest in an object, a means is provided for indicating that the registering process is interested only in objects generated by the process having the source address. Additionally, a destination address can also be specified during the interest registration process. This indicates that the router is interested only in receiving objects distributed to the destination address. In the preferred embodiment, two routines TR_OBJECT_SA (OBJHANDLE) and TR_OBJECT_DA(OBJHANDLE), which can be invoked by the router and application processes or by a user-defined subroutine, are used to access the source address and destination address, respectively, contained in a data object referenced by a handle OBJHANDLE.

Each data object is referenced by a handle rather than a pointer. The handle is used by the various routines to reference a data object and to retrieve its information. The handle is assigned to a data object when it is created by a routine TR_CREATE_OBJECT( ) that is part of the data management and distribution system. The fields of the routine TR_CREATE_OBJECT( ) are described later. To distribute a data object referenced by a handle OBJHANDLE between processes, a routine TR_DISTRIBUTE_OBJECT(OBJHANDLE, MODE[, PERIOD]) is invoked. The MODE field specifies whether the given object is to be distributed once or periodically at the period in milliseconds as specified in the optional PERIOD field. For more detailed description of these and other routines, refer to *InterAgent Toolkit: Reference Manual, Version* 2.0 (1993), which is hereby incorporated by reference.

If an application or router process desires to receive data of a particular type, it registers an interest by invoking a routine TR_REGISTER_INTEREST(TYPE, MODE, USRROUTINE, ARG, PARAMS . . . ), which returns an event handle to identify the interest. The TYPE field determines the type of event that the process is interested in. Possible events include a timer event, a file I/O event, a keyboard I/O event, and receipt of a data object, which are represented by the TYPE field containing the values TRI_

TIMER, TRI_FILEIO, TRI_KEYBD, and TRI_OBJECT, respectively. Timer events provide time-based utilities. There are two types of timer events in the preferred embodiment: single shot timers and periodic timers. Single shot events specify a time delay in milliseconds before the callback routine USRROUTINE is invoked. Periodic timer events provide a mechanism for scheduling timer events with the given period in milliseconds. File events indicate when a file is ready for reading or writing. The keyboard event provides a system independent mechanism for testing for input from the keyboard. A keyboard event occurs whenever someone types one or more keys. The timer, file I/O, and keyboard events are hardware events, such as interrupts or polled events, that are handled through the operating system of each computer system. In response to the listed events, the operating system invokes a corresponding routine for translating the events into objects that can be understood by the routers.

To register a data object interest, one of the following two forms of the routine TR_REGISTER_INTEREST( ) is used. The first is in the form of TR_REGISTER_INTEREST(TRI_OBJECT, TTF_TEMPLATE, USRROUTINE, USRARG, OBJTEMPLATE). Setting the MODE field to the value of the parameter TTF_TEMPLATE specifies that the interest pattern, which includes properties, comes from a prebuilt object template. The properties include an address property, which can specify an interest in objects sent to the address of registering application process or to the address of any other process. The properties can also include certain integer properties for more specific data objects. Another way of registering an interest is using the form TR_REGISTER_INTEREST(TRI_OBJECT, TTF_EXPLICIT, USRROUTINE, ARG, OBJTYPE, PROPLIST). In this case, the object type is explicitly specified in the OBJTYPE field, and the list of properties that the process is registering an interest in are located in the PROPLIST field. In both cases, the USRARG field contains arguments to be passed to the subroutine USRROUTINE. When an object is received that matches the specified interest pattern, the subroutine USRROUTINE is called. Thus, the routine TR_REGISTER_INTEREST( ) is the method by which an application or router process registers its own interests in particular types of objects.

To notify other processes of its interests, an application or router process transmits an interest object ST_RTR_INTEREST(SIZE, FLAGS, DUMMY, TEMPLATE). The SIZE field indicates the size of the interest object, the FLAGS field indicates whether the interest is from a public or private connection, the DUMMY field contains a dummy parameter, and the TEMPLATE field is a pointer to a template containing the properties of an object that the process is interested in. An application process sends an interest object to its local router, which forwards the application's interest object to other routers. A router process can also initiate an interest object, which is sent to router and child processes that have registered an interest in the router's interest change.

Each router process includes a connection table and an interest table. The connection table contains a list of the public connections and the private connections to the local router. Also, each connection is described as being direct or indirect. A direct connection is where two routers are directly connected to each other. An indirect connection occurs if at least one intervening router exists between two routers. Thus, in FIG. 2, routers 212 and 216 are directly connected and routers 212 and 232 are directly connected. However, routers 216 and 232 are indirectly connected. Each connection also has a field TIMEDELAY specifiying the propagation delay between two routers over a connection. Additionally, each connection also includes a PORTNUM field that indicates the port through which two processes are connected. Thus, for a private connection between a router process and its child application process, the field PORTNUM would specify a shared memory location or a socket number defined in Windows or UNIX systems. For connections between two routers, the field PORTNUM represents the driver included as part of the router that controls the actual I/O connection. For example, a connection table can have the following fields:

(1) HOSTID:[0xA,0xC] NAME:CAP TYPE:PRIVATE, DIRECT TIMEDELAY=0 PORTNUM1
(2) HOSTID:[0x1,0xB] NAME:TECH TYPE:PUBLIC, INDIRECT TIMEDELAY=0 PORTNUM2

Element (1) is a direct connection to a child application process CAP represented by host ID [0xA,0xC]. Element (2) is an indirect connection to a router process TECH represented by host ID [0x1,0xB].

The interest table contains a list of the interests of the local router and the interests of child processes and all the other routers connected via public connections. Examples of some interests are shown below.

(1) TYPE: LOCAL ROUTINE=0x42E3BC TEMPLATE: S_TYPE:ST_RTR_INTEREST NUMPROPS=1 PROP0:{PHYSICAL:D1:D2}
(2) TYPE: REMOTE HOSTID=[0xA,0xC] TEMPLATE: S_TYPE:VIDEO NUMPROPS=1 PROP0:{PHYSICAL:D1:D3}
(3) TYPE: REMOTE HOSTID=[0x1,0xB] TEMPLATE: ST_TYPE:S_RTR_STARTUP NUMPROPS=1 PROP0: {PHYSICAL:D4:D5}

Thus, when the application process CAP transmits an interest object ST_RTR_INTEREST( ) to its local router, the properties specified in the TEMPLATE field of the interest object are added to the interest table of the local router as a remote interest, such as that shown in element (2) of the interest table. The interest object ST_RTR_INTEREST includes the source address of the sender, which is converted by the receiving router process into a host ID corresponding to that particular connection. The TEMPLATE field includes the object type and the number of properties NUMPROPS. In this case, the object type is VIDEO to indicate a data object and the value of NUMPROPS is equal to one. The property is an address property contained in the field PROP0. It is appreciated that additional properties can be included, such as integer properties.

If the router process TECH sends out an interest object ST_RTR_INTEREST( ), that information in the interest object is added to the interest table also as a remote interest, such as that shown in element (3) of the interest table. The format for the remote router interest is the same as for the applicaton router interest. In this case, the object type of interest is the startup object ST_RTR_STARTUP and the address property of interest is the address PHYSICAL:D4:D5. It is noted that both interests (1) and (2) contain a host ID to allow the router to access the corresponding connection information in the connection table.

A destination list is built by a router if it receives an object from a child process. Since the child application process does not know about the locations of all the other processes, the destination list is the means by which the router transmits the information to routers that are interested in the object sent by the child process. From the information in the interest table and the connection table, a local router builds the destination list containing the host IDs of the interested routers. The local router then uses the PORTNUM fields in the connection table to appropriately route the object through the appropriate drivers and connections.

Element (1) of the interest table is an interest local to the router, added by the routine TR_REGISTER_INTEREST( ) invoked by the local router. If an object contains properties matching the local interest, the router invokes the subroutine located at address 0x42E3BC to handle the object. The TEMPLATE field of the interest also includes a TYPE field specifying the type of object interested and the number of properties NUMPROPS. In this case, type of object interested is the interest object ST_RTR_INTEREST( ) and the address property of interest is address PHYSICAL:D1:D2. The local router registers interests in such objects as a startup object ST_RTR_STARTUP( ) indicating that another router or a child process has started, an interest object ST_RTR_INTEREST( ) sent by an application or router process indicating an interest change, or a query object sent by another router querying the local router's connections. These are objects used for control of communications between the routers. The invoked subroutine performs the requisite functions to respond to such objects.

Additionally, each application process includes a mini-interest table listing its own interests. These interests are entered into the table when the application process runs the TR_REGISTER_INTEREST( ) routine. When an object is forwarded by the local router to its child application process, the application process accesses its mini-interest table to determine if it is interested in the received object. Each element of the mini-interest table is similar in format to the local element (1) in the router interest table above. The purpose of the mini-interest table is to allow the application process to invoke the proper subroutine when an object is received.

As noted above, the LAN 202 is connected to the LAN 204 via the connection 206, which is preferably a remote connection, such as a 56 kbps dial-up line or T1 connection and so forth, as well known in WAN development. Data transferred over the connection 206 is managed by the router 212 running on the computer 208 and by a router process 236 running on the computer 210. In one configuration, the connection 206 is treated as a private connection, that is, the router process 236 is treated effectively as a child process with respect to the router process 212, and vice versa. The connection 206 is referred to as a "bridge" connection. As will be explained below, a public and private connection is defined by the startup object ST_RTR_STARTUP( ).

Thus, the routers in the LAN 202 are aware of the interests of only the router 236 in the LAN 204, and the routers in the LAN 204 are aware only of the interests of the router 212 in the LAN 202. This configuration is desirable where, for example, general access to one network is to be denied to the other network. Thus, routers 212 and 236 act as "gateways" on their respective networks to allow transmission of only certain types of information. As an alternative configuration, the connection 206 can be treated as any other public connection, thereby allowing routers in both LANs 202 and 204 to know each other's interests. In either configuration, data to be transferred between a process in the LAN 202 and a process in the LAN 204 must pass through routers 212 and 236.

Two processes 238 and 240 running on the computer 210 are connected to the router 236. The computer 210 is connected to a computer 242 over a connection 248. A router process 244 and an application process 246 run on the computer 242. Both routers 236 and 244 are connected to a router 249 running on a computer 250. The computers 236 and 250 are connected by a connection 252, and the computers 242 and 250 are connected by a connection 254. As shown, two processes 256 and 258 run on the computer 250. The routers 236, 244 and 249 perform the data management and distribution functions in the LAN 204, and are also implemented according to the preferred embodiment of the present invention.

Figure 2B:
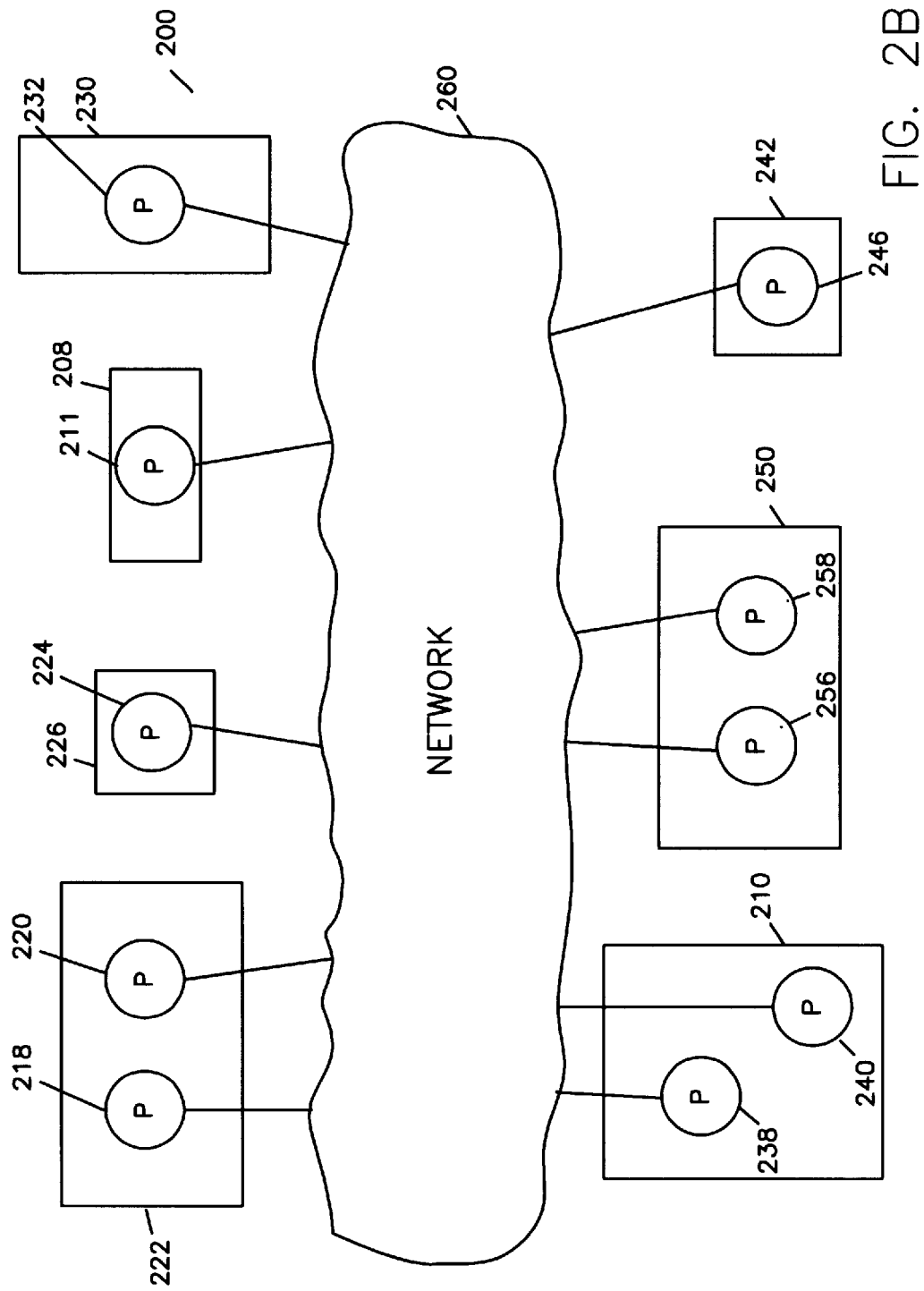
FIG. 2B is a "conceptual" block diagram of the exemplary network of FIG. 2A.

Referring now to FIG. 2B, a more conceptual view of the WAN 200 is shown. The routers and connections between computers are generally represented as a network block 260, with all the application processes connected to the network block 260. As can be seen, one advantage of such a network is that the processes do not have to be limited to being configured either as a client or a server. The processes are dynamically configurable as either a client, a server, or both. Another advantage is that all processes are able to communicate with one another through the network block 260.

For data objects to be recognized by the routers, they must be first defined. First, an object description file is created that contains information about the fields and the object type of each object. For more details of how some sample objects are defined, refer to *InterAgent Toolkit: User Manual, Version 2.0* (1993) (hereinafter "InterAgent Manual"), which is hereby incorporated by reference. The object description file is then compiled by the user to create a header file and a resource file. The resulting resource file is installed in a local resource directory on each computer that will send or receive the defined objects. This resource file is needed by each router process for recognition of the defined data objects. Again, for more information on compiling object description files and installing resource files, refer to the InterAgent Manual.

Once a data object has been defined, any number of instances of the data object may be created. To create an instance of a data object, a routine TR_CREATE_OBJECT (TYPE, MODE) is called. The TYPE field indicates the type of data object to be created. The MODE field indicates whether the object is shared among several processes or not. To access the data portion of a data object referenced by a handle OBJHANDLE, a routine TR_OBJECT_DATA (OBJHANDLE, MODE) is used, where the MODE field indicates whether the data object is shared among its recipients. To retrieve other information contained in a data object such as its type and size, as well as the size of the data contained within, a routine TR_OBJECT_INFO (OBJHANDLE, TYPE) is used. The TYPE parameter is set to a value TOBJ_SIZE to obtain the object size, to a value TOBJ_TYPE to obtain the object type, and to a value TOBJ_DATASIZE to obtain the size of the data in the object. Again, both routines TR_OBJECT_DATA( ) and TR_OBJECT_INFO( ) can be invoked by a router or application process or by a user-defined subroutine to obtain the desired information.

Figure 4:
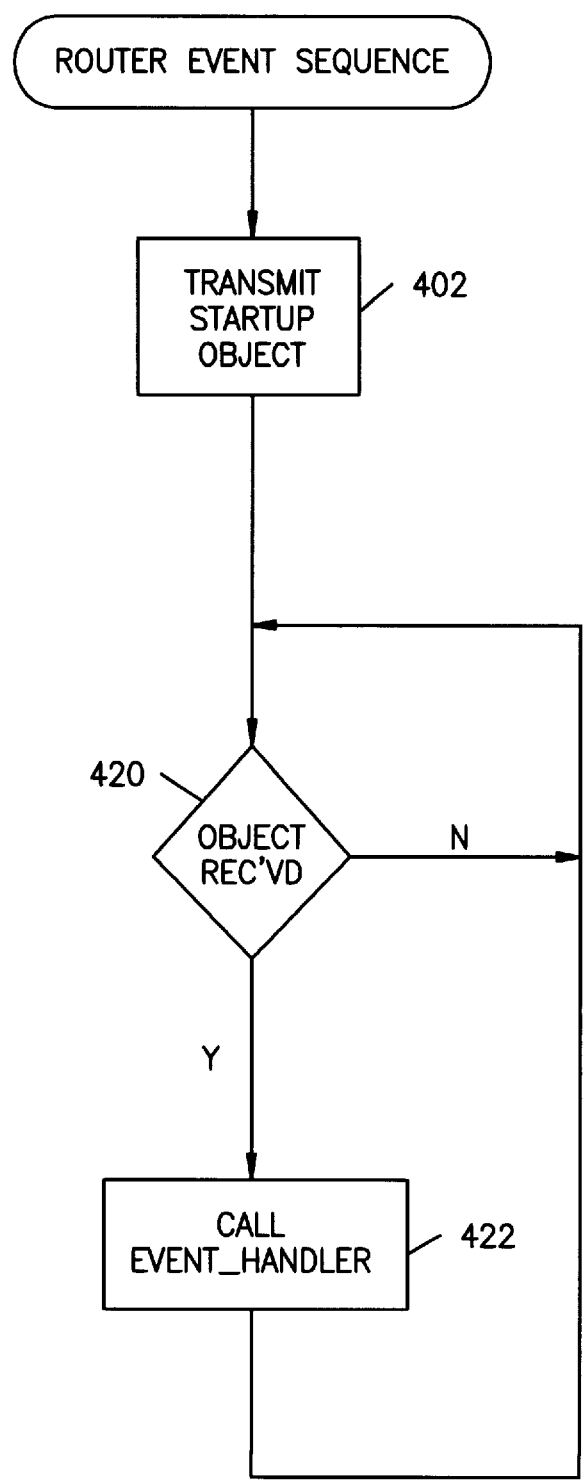
FIG. 4 is a flow diagram of the event sequence of a router process.

Referring now to FIG. 4, a flow diagram of the router event sequence is shown. Beginning in step 402, when a router is initially started up, the router sends out a startup object ST_RTR_STARTUP( ) to notify the other routers of its existence. The object ST_RTR_STARTUP( ) contains such information as the host name, the host ID, the type of host (public if sent by a router and private if sent by an application). Proceeding next to step 420, it is determined if an object has been received, either through a private connection or a public connection. If not, control stays in step 420 until an object has been received, in which case, control proceeds to step 422, where a subroutine EVENT_HANDLER is called. From step 422, control returns to step 420, where the local router waits for receipt of the next object.

Generally, the event sequence for an application process is similar to that of a router process. Upon startup, the application process transmits a startup object to its local router. Next, the application process registers certain of its interests in its mini-interest table and transmits an interest object ST_RTR_INTEREST( ) to its local router to indicate its interests. Registration of interests and transmission of interest change objects are a continuing process for the application process as they are executing. The application process responds to receipt of data objects by comparing the properties of the data object with the properties of the interests in the interest table. If a match occurs, the application process invokes a subroutine to properly respond to the data object.

Figure 5:
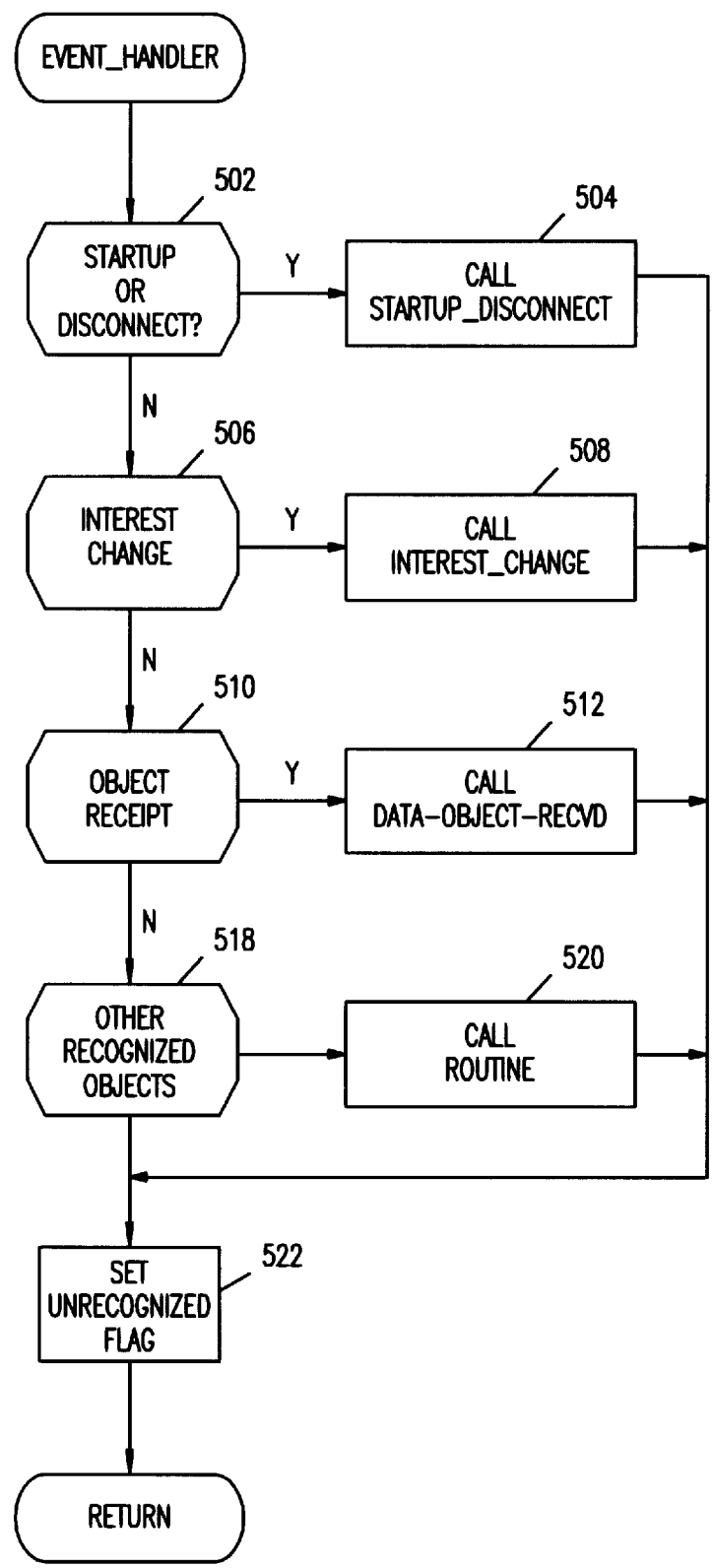
FIG. 5 is a flow diagram of the sequence for handling a received event.

A flow diagram of the subroutine EVENT_HANDLER is shown in FIG. 5, to which reference is now made. In step 502, it is determined if a startup event initiated by an application or another router, or a disconnect event, is detected. When a router or application starts up, it sends out the object ST_RTR_STARTUP( ). A disconnect event is actually indicated by an internal flag in the router, which is set when a connection is detected to have failed. In the preferred embodiment, public and private connections are tested by exchanging an object ST_RTR_CONNPING (TYPE, TIME, ID) approximately every 15 seconds. A router sends the object ST_RTR_CONNPING( ) to another child or router process only if that other router has registered an interest in the object. The TYPE field indicates whether the connection is private or public, the TIME field indicates the amount of delay between two processes, and the ID field is a unique identifier for the object exchange request. When a router sends out a "ping" object over a connection to another process, it starts a timer that times out in approximately two minutes. If the local router has not received a response from the other process before the timer times out, then the internal disconnection flag is set to indicate a connection failure. In response to a ping object that a router is interested in, the router invokes a special subroutine specified in its interest table to handle the response to the ping object. The response involves sending back a ping object as an acknowledge. A hardware failure over a connection between two computers are detected by the respective OS drivers, which inform the router drivers of the failure. Detection of the hardware failure also causes the internal disconnection flag to be set.

If a startup object is received or a connection failure event occurs, control proceeds from step 502 to step 504, where a subroutine STARTUP_DISCONNECT for handling startup and disconnect events is called. Otherwise, control proceeds to step 506, where it is determined if an interest change has occurred in the router's child processes or another router.

As explained above, an interest change is indicated by the receipt of the interest change object ST_RTR_INTEREST( ). If an interest change from another router is received, control proceeds to step 508, where a subroutine INTEREST_CHANGE for handling interest changes is called. If an interest change is not detected in step 506, then control proceeds to step 510, where it is determined if a data object has been received. If so, control proceeds to step 512 where a subroutine DATA_OBJECT_RECVD for handling the receipt of data objects is invoked. Otherwise, if a data object is not received in step 510, control proceeds to step 518, where it is determined if other objects such as a ping object ST_RTR_CONNPING, a connection status object ST_RTR_CONNSTATUS, and the timer, file I/O or keyboard object have been received. If so, control proceeds to step 520, where a subroutine is invoked for handling these type objects. If a timer, file I/O or keyboard object is received, the objects are forwarded to the child process that has registered an interest in the objects. The child process then invokes a subroutine as appropriate for handling the events. If the received object is ST_RTR_CONNPING, then the receiving router accesses its interest table to determine if it is interested. If so, a subroutine is called to send back a ping object to the originating router. If the received object is ST_RTR_CONNSTATUS, the connection table of the receiving router is updated. The function of the object ST_RTR_CONNSTATUS is described below. Other routines also exist which are not described for simplicity. If the objects are not recognized in step 518, control proceeds to step 522, where an unrecognized event flag is set. From steps 504, 508, 512 or 518, control returns to step 422 in FIG. 4.

Figure 6:
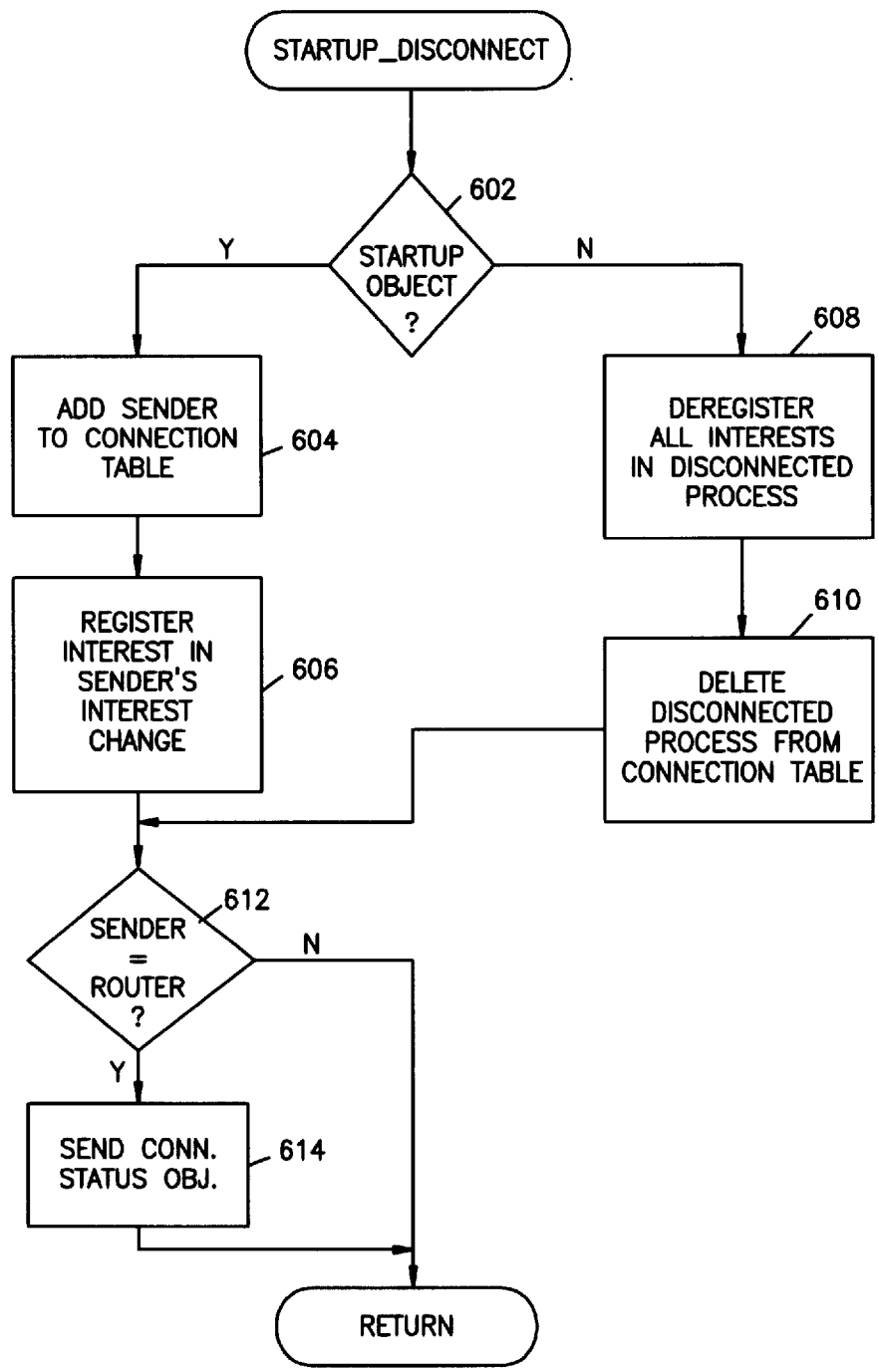
FIG. 6 is a flow diagram of the sequence for handling a startup or disconnect event.

Referring now to FIG. 6, a flow diagram is shown of the subroutine STARTUP_DISCONNECT invoked in step 504 of FIG. 5 to handle the receipt of startup objects or detection of connection failures. In step 602, it is determined if a startup object ST_RTR_STARTUP( ) has been received by, for example, the router 212. The startup object ST_RTR_STARTUP( ) can be from a child process or another router process. If a startup object is received, control proceeds to step 604, where the connection information of the router or application process sending the startup object is added to the connection table of the router 212. In this step, a field OBJTYPE is set to the value of a flag TCS_NEW_CONN. The connection information includes the host ID, the host name, the type of connection, whether the connection is direct or indirect (through another router), the propagation delay time of the connection from the other router or application process, and the port number to the other router or application process. Proceeding next to step 606, the router 212 registers an interest in obtaining future interest changes of the router or application process sending the startup object, thereby allowing the router 212 to obtain future updated interest patterns from the sending router. This is done by the router 212 sending an interest change object ST_RTR_INTEREST( ) specifying that the router 212 is interested in the interest changes of the process that is starting up.

Proceeding next to step 612, the router 212 determines if the startup object is received over a public connection. If not, control returns to step 504. If the startup object is received over a public connection, control proceeds to step 614, where the router 212 sends an object ST_RTR_CONNSTATUS(SIZE, OBJTYPE, ID, DATA) to other routers informing them of a possible connection change. For example, if router 216 sends a startup object, then the router 212 transmits the object ST_RTR_CONNSTATUS( ) to routers 232 and 236 to inform them of the change in the connections of the router 212. It is noted that routers 232 and 236 must first have registered interests in the object ST_RTR_CONNSTATUS( ) distributed by the router 212. The SIZE field indicates the size of the connection status object ST_RTR_CONNSTATUS( ), and the OBJTYPE field indicates the type of status information. The OBJTYPE field is set to the value of the flag TCS_NEW_CONN for indicating that the object contains information on a new connection, the flag TCS_CONN_FAILED to indicate that a connection has failed, and the flag TCS_CONN_STATUS for indicating that the object contains a list of the current connections of the router. The ID field specifies a unique ID for the object, and the DATA field includes the appropriate connection information. Thus, since the OBJTYPE field has been set to the value of the flag TCS_NEW_CONN in step 604, the transmitted connection status object contains information on the new connection 214.

In step 602, if it is determined that the object received is not a startup object, then a connection failure has been detected by the router 212. Control then proceeds to step 608, where the router 212 deregisters all interest in the router or application process that caused the connection failure. The router 212 accomplishes this by removing all interests associated with the failed router or application from the interest table. Proceeding next to step 610, the connection information of the failed router or application process is removed from the connection table of the router 212. In addition, the OBJTYPE field is set to the value of the flag TCS_CONN_FAILED. From step 610, control proceeds to step 612, where it is determined if the failed connection is to another router. If so, control proceeds to step 614, where the connection status object ST_RTR_CONNSTATUS( ) is sent with the OBJTYPE field equal to TCS_CONN_FAILED to notify of a failed connection. Other routers receiving the connection status object ST_RTR_CONNSTATUS( ) update their connection tables as appropriate. From step 614, control returns to step 504 of FIG. 5.

Figure 7:
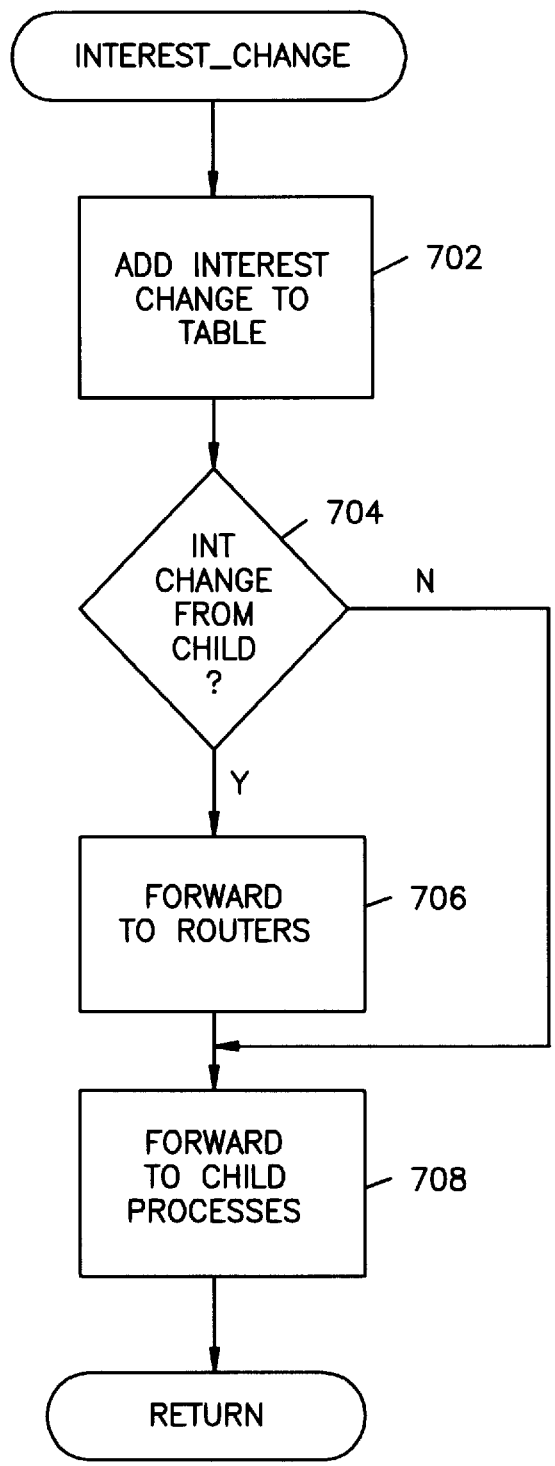
FIG. 7 is a flow diagram of the sequence for handling an interest change event.

Referring now to FIG. 7, a flow diagram is shown of the subroutine INTEREST_CHANGE invoked in step 508 of FIG. 5 to handle the receipt of interest change objects distributed by a child process or other routers. When an interest change object ST_RTR_INTEREST( ) is received, the interest table of the receiving router is updated in step 702. It is noted at this point that if a receiving router is not interested in the received interest object ST_RTR_INTEREST( ), then the receiving router accesses its interest table to determine which other router is interested in the object and forwards accordingly. The interest template included in the object ST_RTR_INTEREST( ) is added to or replaces an entry in the local router's interest table. The interest change object ST_RTR_INTEREST( ) includes the source address of the process originating the interest change. From the source address, the receiving router determines the host ID of the originating process, which is added to the interest table. Control then proceeds to step 704, where it is determined if the interest change is requested by one of the router's child processes or by another router, as indicated by the FLAGS field of the object ST_RTR_INTEREST( ). If the interest change is sent by another router over a public connection, control proceeds from step 704 to step 708, where the interest change object is forwarded to the router's child processes that have registered an interest in the interest changes of the sending router. As child ___ processes that are applications would not have registered an interest in an interest change object, the local router would not forward a received interest change object to those child processes. However, as discussed above, the connection 206 is preferably configured as a bridge connection between two routers 212 and 236. Thus, each of the routers 212 and 236 may have registered an interest in the interest change object of the sending router, and therefore, would receive the interest change object. Each interest object ST_RTR_INTEREST( ) includes a source address, which is preferably the physical address of the process transmitting the interest object. When distributed by another router process, the source address is that of the originating router. However, before forwarding the interest object to its child process, the router substitutes the originating router's sources address with its own.

If, in step 704, it is determined that the interest change object is received over a private connection, then control proceeds to step 706, where the interest change is forwarded to other routers that have registered an interest in the interest change of the application process. In this case, the original source address contains the physical address of the child process. Before forwarding the interest object ST_RTR_INTEREST( ), the child's source address is substituted with the router's source address. Next, control proceeds to step 708 to forward the interest changes to interested child processes, such as the router connected over the bridge 206. In all cases, a router receiving an interest change object modifies the source address information, substituting its own source address for the source address of the originating process. This allows the process receiving the forwarded interest change object to determine the connection over which the interest change arrives. From step 708, control returns to step 508 in FIG. 5.

Figure 8:
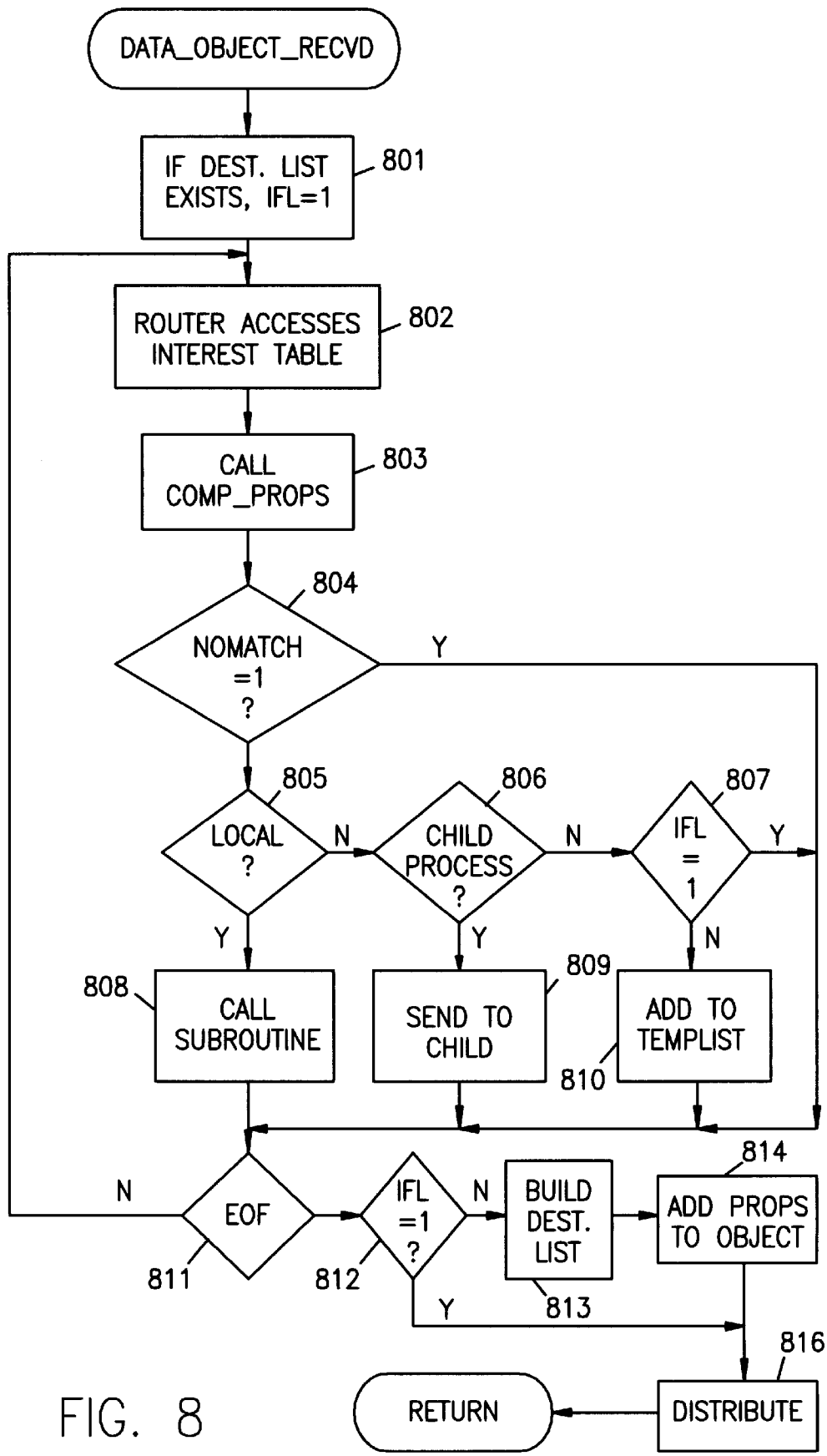
FIG. 8 is a flow diagram of the sequence for handling a data object event.

Referring now to FIG. 8, a flow diagram of the subroutine DATA_OBJECT_RECVD invoked in step 512 of FIG. 5 for handling the receipt of a data object is shown. Beginning in step 801, the receiving router determines if the data object includes a destination list. If so, a flag IFL is set high. If a destination list is not included, then the data object is sent by a child process and the receiving router must build a destination list to distribute the data object to other interested processes. From step 801, control proceeds to step 802, where the receiving router accesses the first entry of its interest table. Next, in step 803, a subroutine COMP_PROPS for comparing the properties in the received data object and the properties of the local interest retrieved from the interest table is performed. Next, in step 804, it is determined if a flag NOMATCH is set high by the subroutine COMP_PROPS, indicating that the comparison has failed. If the property comparison is unsuccessful, control proceeds directly to step 811. If the property comparison is successful, then control proceeds to step 805, where it is determined if the interest is local or remote. If local, control proceeds to step 808, where a subroutine whose address is specified in the matching local interest is invoked.

If the interest is remote, control proceeds to step 806, where it is determined if the interest corresponds to a child process. This is accomplished by the router retrieving the host ID from the matching interest table and accessing the connection table entry corresponding to the host ID to determine if the connection is private. If so, control proceeds to step 809, where the data object is sent to the child process. It is noted that if a destination list exists in the data object, that destination list is removed before being sent to the child process. If the remote interest does not belong to a child process, then control proceeds to step 807, where the state of the flag IFL is determined. If high, indicating that the received data object contains a destination list, control proceeds to step 811. If the flag IFL is low, indicating that the data object does not include a destination list, i.e., the data object came from a child process, control proceeds to step 810, where the host ID associated with the matching interest is placed in a temporary list for later use in building the destination list. From step 808, 809 or 810, control proceeds to step 811, where it is determined if the end of the interest table has been reached. If not, control returns to step 802, where the router accesses the next entry in the interest table.

If the end of the interest table has been reached, control proceeds to step 812, where the router determines if the flag IFL is high. If so, a destination list exists and does not need to be built. As a result, control proceeds directly to step 816. If the flag IFL is high, control proceeds to step 813, where the destination list is built from the temporary list and the connection table. Next, control proceeds to step 814, where the destination list is added to the data object. Next, in step 816, the router distributes the data object to the other interested processes by calling a distribution routine. The distribution routine utilizes the destination list and connection table to control the transmission of the data object through the appropriate drivers. The PORTNUM field in the connection information defines the port through which the data object is to be routed. From step 816, control returns to step 512 in FIG. 5.

Preferably, the connection information of interested router processes have been forwarded to the distribution routine. Based on the connection information, the data object is distributed to routers that are directly connected to the current router. The target router processes that are indirectly connected are forwarded through other routers. The directly connected processes are deleted from the destination list as the data object is transmitted so that other router processes do not forward the same objects again to those deleted target processes. As data objects are forwarded at each subsequent step, target routers are taken off the destination list until it is empty. However, in certain connection schemes, certain processes may receive the same data objects from more than one router anyway. In this case, the receiving router simply ignores any duplicate objects. As a data object is distributed, it is associated with a special sequence number which is passed along with the object. This sequence number is unique to the data object. Thus, if a router receives two objects having the same sequence number, one of them is ignored.

Figure 12:
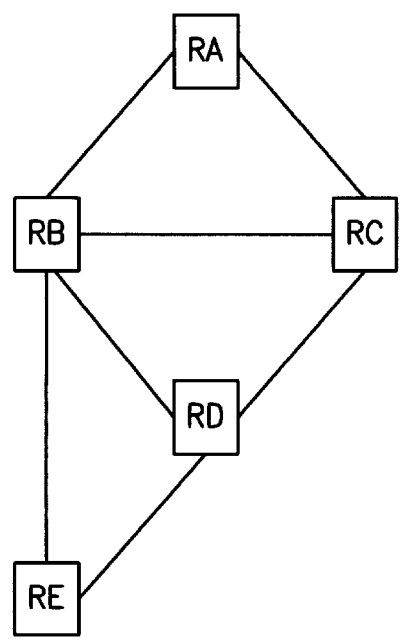
FIG. 12 is a block diagram of an exemplary router network.

For example, in FIG. 12, a router RA is directly connected to routers RB and RC. Both routers RB and RC are directly connected to each other and to a router RD, which is directly connected to a router RE. The router RE is also directly connected to router RB. Thus, if the router RA sends a data object including a destination list that targets routers RB, RC, RD and RE, it distributes the objects directly to routers RB and RC, deleting those routers from the destination list. When the routers RB and RC receive the data object, they do not send the object to each other. However, both routers forward the data object to router RD, which receives two identical objects. The router RD is deleted from both the destination lists of both copies of the data object. The router RD simply ignores one of the duplicate objects. The router RB also sends the data object to router RE, as does router RD after it receives the data object. Again, the router RE simply ignores the duplicate copy of the data object.

Figure 9:
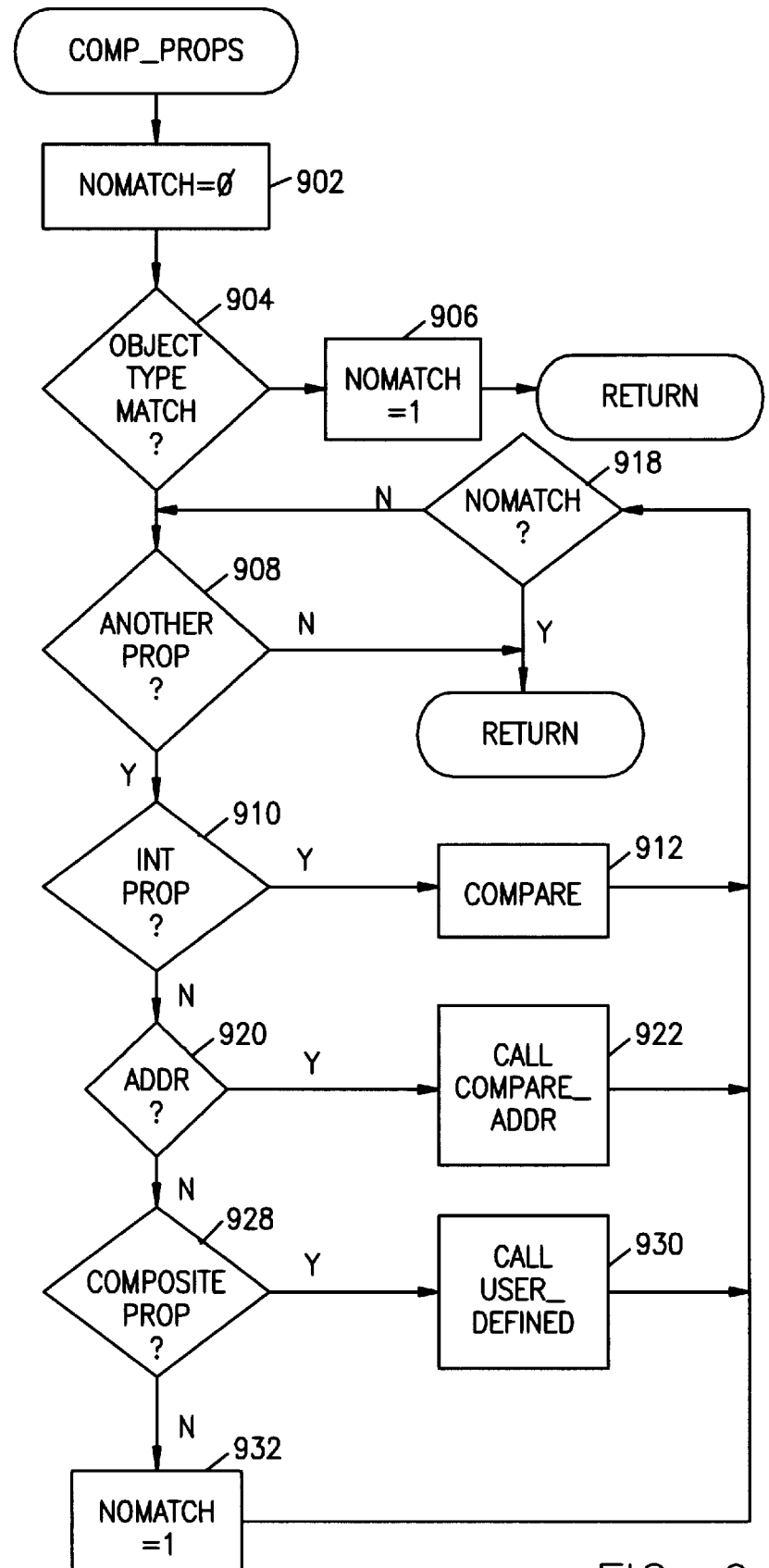
FIG. 9 is a flow diagram of the sequence for comparing properties of the data object.

Referring now to FIG. 9, a flow diagram is shown of the subroutine COMP_PROPS invoked in step 804 for performing the property comparison. In step 902, the flag NOMATCH is set low. Next, in step 904, it is determined if the object type specified in the data object matches the object type in the accessed interest from the interest table. If the object types do not match, then control proceeds to step 906, where the flag NOMATCH is set high. From step 906, control returns to step 804. If the object types match, then control proceeds from step 904 to step 908, where it is determined if another property is located in the data object. If so, control proceeds to step 910, where it is determined if the property is an integer. If the property is an integer, control proceeds to step 912, where the integer property of the data object is compared with the integer property retrieved from the interest table. If the comparison fails, then the flag NOMATCH is set high. From step 912, control proceeds to step 918, where it is determined if the flag NOMATCH is set high. If so, control returns to step 814, as the property comparison has failed. If the flag NOMATCH is low, then control proceeds to step 908, where it is determined if there is another property in the data object. If not, control returns to step 814.

In step 910, if it is determined that the retrieved property is not an integer, control proceeds to step 920, where it is determined if the property is an address. If so, control proceeds to step 922, where a subroutine COMPARE_ADDR is called for comparing the address specified in the data object with the address retrieved from the interest table. If the comparison is unsuccessful, the subroutine COMPARE_ADDR sets the flag NOMATCH high. From step 922, control proceeds to step 918. If in step 920, it is determined that the property is not an address, control proceeds to step 928, where it is determined if the property is a "composite-structure" property. Such a property is defined by the user as a structure containing any number of fields. For example, a composite-structure property can be defined as follows:

```
STRUCTURE IMAGE_CHECK  {
        UINT4        TYPE;
        UINT4        VIDEO_BOARD_NAME;
        UINT4        TIME_OF_CAPTURE;
        CHAR         CAPTION[32];
}
```

If the property is determined to be a composite-structure property in step 928, control proceeds to step 930, where a user-defined subroutine is invoked for comparing the fields in the composite-structure property. As each composite-structure property is uniquely defined by the user, the invoked subroutine must similarly be user defined to perform the proper comparison. The invoked subroutine sets the flag NOMATCH high if the comparison is unsuccessful. From step 930, control then proceeds to step 918.

If it is determined in step 928 that the property is not a user-defined composite-structure property, control proceeds to step 932, where the flag NOMATCH is set high to indicate an unsuccessful property comparison. From step 932, control proceeds to step 918.

Figure 10:
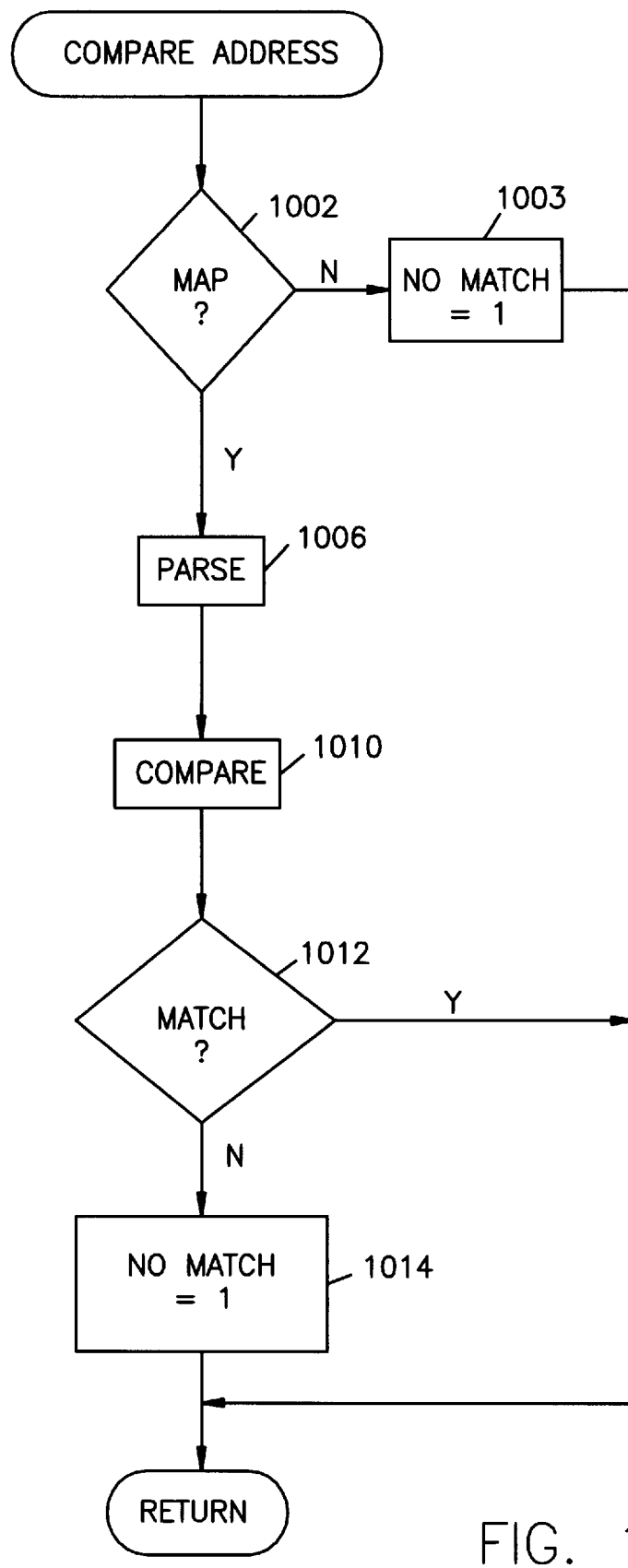
FIG. 10 is a flow diagram of the sequence for comparing the address property of the data object event.

Referring now to FIG. 10, the subroutine COMPARE_ADDR for comparing the address property invoked in step 922 is shown. Next, in step 1002, it is determined if the map specified by the data object matches the map retrieved from the interest table. If the match fails, then control proceeds to step 1003, where the flag NOMATCH is set high. From step 1003, control returns to step 922 in FIG. 9. If in step 1002, the maps match, control proceeds to step 1006, where all existing OR "^" and AND ":" operations, as well as wildcards "*", in the address of the data object and of the interest are parsed. Thus, for example, in an address MAP:D1:D2^D4:D3, the terms are "D1:D2" or "D1:D2:D4:D3." For an address MAP:D1:*, a match occurs to address MAP:D1, MAP:D1:D2 or MAP:D1:D2:D3, among others. From step 1006, control proceeds to step 1010, where the parsed terms from the data object and the interest are compared. Next, in step 1012, it is determined if a match occurs. If so, control returns to step 922 in FIG. 9. If the addresses do not match, control proceeds to step 1014, where the flag NOMATCH is set high. From step 1014, control returns to step 922 in FIG. 9.

Referring back to FIG. 2, an example is described below of various operations of the data management and distribution system. Assume router 212 is running and all other processes are not yet started. When the application process 211 starts up, it sends a startup object ST_RTR_

STARTUP( ) to the router 212, which adds the information in the startup object to its connection table, as follows.

HOSTID:[0xA,0xC] NAME:APP1 TYPE:PRIVATE, DIRECT TIMEDELAY=0 PORTNUM1

Next, assume routers 216 and 236 start up, sending startup objects to the router 212. The connection table is updated as follows:

HOSTID:[0xA,0xC] NAME:APP1 TYPE:PRIVATE, DIRECT TIMEDELAY=0 PORTNUM1
HOSTID:[0xB,0x1] NAME:ROUT1 TYPE:PUBLIC, DIRECT TIMEDELAY=0 PORTNUM2
HOSTID:[0xC,0x3] NAME:ROUT2 TYPE:PRIVATE, DIRECT TIMEDELAY=0 PORTNUM3

Next, the router 212 registers an interest in interest change objects by executing the routine TR_REGISTER_INTEREST( ). The interest table is updated as follows, where the physical address of the router 212 is PHYSICAL:HOST208:R212.

TYPE: LOCAL ROUTINE=ox42E3BC
TEMPLATE: S_TYPE:ST_RTR_INTEREST NUMPROPS=1
PROP0:{PHYSICAL:HOST208:R212}

Thus, when the router 212 receives an interest change object ST_RTR_INTEREST having an address property equal to its physical address, it executes the subroutine addressed by 0x42E3BC. Next, the router 212 sends out an interest change object to started-up routers 216 and 236 and application process 211 to register an interest in interest change objects originated by the processes. The application process 211 simply ignores the interest change object. However, the routers 216 and 236 update their interest tables to indicate that router 212 is interested in their interest changes. Additionally, both routers 216 and 236 may send interest change objects back to router 212 to indicate to router 212 that the routers 216 and 236 are interested in interest change objects of the router 212. In response, the router 212 updates its interest table as follows:

TYPE: LOCAL ROUTINE=0x42E3BC
TEMPLATE: S_TYPE:ST_RTR_INTEREST NUMPROPS=1
PROP0:{PHYSICAL:HOST208:R212}
TYPE: REMOTE HOSTID=[0xB,0x1]
TEMPLATE: S_TYPE:ST_RTR_INTEREST NUMPROPS=1
PROP0:{PHYSICAL:HOST222:R216}
TYPE: REMOTE HOSTID=[0xC,0x3]
TEMPLATE: S_TYPE:ST_RTR_INTEREST NUMPROPS=1
PROP0:{PHYSICAL:HOST210:P236}

Thus, the router 212 now knows that routers 216 and 236 are interested in the interest change objects of router 212. Thus, whenever the interests of the router 212 changes, it sends out interest objects ST_RTR_INTEREST( ) to routers 216 and 236. Each interest object includes a template, which includes an address property. Thus, when sending the interest change objects to routers 216 and 236, the router 212 specifies the destination addresses PHYSICAL:HOST222:R216 and PHYSICAL:HOST210:P236, respectively, in the address property of each of the two interest objects sent to routers 216 and 236.

As a further example, assume that routers 216 and 236 register an interest in an object having type VIDEO. The routers 216 and 236 transmit the interest change object ST_RTR_INTEREST( ), which now includes a template containing the properties of the object having type VIDEO. The router 216 registers an interest in object type VIDEO having an address property PHYSICAL:HOST222:R216, and the router 236 registers an interest in object type VIDEO having an address property PHYSICAL:HOST210:P236. The interest table of router 212 is now updated to:

TYPE: LOCAL ROUTINE=0x42E3BC
TEMPLATE: S_TYPE:ST_RTR_INTEREST NUMPROPS=1
PROP0:(PHYSICAL:HOST208:R212)
TYPE: REMOTE HOSTID=[0xB,0x1]
TEMPLATE: S_TYPE:ST_RTR_INTEREST NUMPROPS=1
PROP0:{PHYSICAL:HOST222:R216}
TYPE: REMOTE HOSTID=[0xC,0x3]
TEMPLATE: S_TYPE:ST_RTR_INTEREST NUMPROPS=1
PROP0:{PHYSICAL:HOST210:P236}
TYPE: REMOTE HOSTID=[0xB,0x1]
TEMPLATE: S_TYPE:VIDEO NUMPROPS=1
PROP0:{PHYSICAL:HOST222:R216}
TYPE: REMOTE HOSTID=[0xC,0x3]
TEMPLATE: S_TYPE:VIDEO NUMPROPS=1
PROP0:{PHYSICAL:HOST210:P236}

It is noted that, at this point, only the startup object ST_RTR_INTEREST and a data object having type VIDEO and the specified address is sent over the WAN connection 206. Other objects are not sent to the router 236. This is advantageous as the traffic over the relatively slow connection 206 is reduced dramatically. In the prior art broadcast systems, all data objects would have been transmitted over connection 206, which would result in reduced overall system performance.

Next, the application process 211 may register an interest in a data object having type AUDIO. The interest object includes a source address, which is the physical address of the application process 211. The router 212 uses the source address information to determine the host ID of the sender. The interest table then becomes:

TYPE: LOCAL ROUTINE=0x42E3BC
TEMPLATE: S_TYPE:ST_RTR_INTEREST NUMPROPS=1
PROP0:(PHYSICAL:HOST208:R212)
TYPE: REMOTE HOSTID=[0xB,0x1]
TEMPLATE: S_TYPE:ST_RTR_INTEREST NUMPROPS=1
PROP0:{PHYSICAL:HOST222:R216}
TYPE: REMOTE HOSTID=[0xC,0x3]
TEMPLATE: S_TYPE:ST_RTR_INTEREST NUMPROPS=1
PROP0:{PHYSICAL:HOST210:P236}
TYPE: REMOTE HOSTID=[0xB,0x1]
TEMPLATE: S_TYPE:VIDEO NUMPROPS=1

PROP0:{PHYSICAL:HOST222:R216}
TYPE: REMOTE HOSTID=[0xC,0x3]
TEMPLATE: S_TYPE:VIDEO NUMPROPS=1
PROP0:{PHYSICAL:HOST210:P236}
TYPE: REMOTE HOSTID=[0xA,0xC]
TEMPLATE: S_TYPE:AUDIO NUMPROPS=2
PROP0:{PHYSICAL:HOST208:P211}
PROP1:{AUTHOR:1}

Thus, the process 211 has registered an interest in the data object having type AUDIO, address property PHYSICAL:HOST208:P211, and integer property AUTHOR equal to 0x1. At the same time, the application process 211 executes the routine TR_REGISTER_INTEREST( ) to register an interest in its local mini-interest table. The mini-interest table may be as follows:

TYPE: LOCAL ROUTINE=0x72F3BC
TEMPLATE: S_TYPE:AUDIO NUMPROPS=2
PROP0:{PHYSICAL:HOST208:P211}
PROP1:{AUTHOR:0x1}

In response to the interest object sent by the application process 211, the router 212 forwards the interest object to the routers 216 and 236. The interest object is slightly modified by the router 212 by substituting the physical address of the router 212 for the physical address of the child process 211 in the source address information associated with the interest object.

When a data object having type AUDIO, address property PHYSICAL:HOST208:P211, and integer property AUTHOR equal to 0x1 is received by the router 212, it finds that the the process 211 has registered an interest in the object from its interest table. The router 212 then forwards the object to the application process 211. The application process 211 accesses its own mini-interest table. After determining that the data object matches its interests, the application process 211 invokes a subroutine located at address 0x72F3BC.

The data object having type AUDIO can look like the following:

```
STRUCTURE S_OBJECT  {
        UINT4           AUDIO_SIZE;
        S_TYPE          AUDIO;
        UINT2           TGL_FLAGS;
        UINT2           TGL_DUMMY;
        S_PTRFIELD              OBJ_DATA_INFO;
        S_PTR                   OBJ_DATA;
        S_PROPERTY              OBJ_PROPS;
        S_PROPERTY              OBJ_DADDR;
        S_DEST                  OBJ_DEST_LIST;
}
```

The specified data object has size TGL_SIZE and type AUDIO. Its data is located at a location pointed to by OBJ_DATA, and the attributes of the data are located at OBJ_DATA_INFO. The integer property

```
#DEFINE         AUDIO           0x1
``` is located in the property structure located at OBJ_PROPS, and the address property PHYSICAL:HOST208:P211 is located at OBJ_DADDR.

When the router 232 starts up, it sends a startup object ST_RTR_STARTUP( ) to the router 212, which updates its connection table. The router 212 then sends a connection status object ST_RTR_CONNSTATUS to inform the router 216 that the router 232 has started up. The router 216 responds by updating its connection table.

If the router 232 distributes a data object targeted at routers 212 and 216, the destination list originally looks like the following:

```
STRUCTURE S_DEST   {
        UINT4           TGL_SIZE;
        S_DESTINFO   {
                S_HOSTINFO      [0xD,0x4];   (ROUTER 212)
                S_HOSTINFO      [0xB,0x1];   (ROUTER 216)
        }
}
```

The router 232 distributes the data object to the router 212, as it is directly connected. The value [0xD,0x4] is removed and replaced with a NULL value. When the router 212 receives the data object, it sees only the router 216 as a destination. As a result, the object is forwarded to the router 216, with the value [0xB,0x1] set equal to the NULL value. The router 216 does not forward the data object anywhere as all possible destinations are set to NULL.

Assume that when the router 212 receives the data object, it determines from its interest table that the router 236 has registered an interest. In that case, the data object is forwarded to the router 236, with the destination list stripped from the data object. This is done whenever a router forwards a data object to a child process. When the router 236 receives the data object, it makes a determination of which of the processes in the LAN 204 are interested in the data object. If it determines that both routers 244 and 249 are interested, it builds a destination list having the following structure:

```
STRUCTURE S_DEST   {
        UINT4           TGL_SIZE
        S_DESTINFO   {
                S_HOSTINFO      [0xE,0xF];   (ROUTER 244)
                S_HOSTINFO      [0xD,0x2];   (ROUTER 249)
        }
}
```

The destination list is added to the data object, which is then distributed to routers 244 and 249, which are directly connected. Before the data object is actually sent, the router 236 sets the values [0xE,0xF] and [0xD,0x2] to NULL. Thus, when routers 244 and 249 receive the data object, they do not forward the data object to each other.

Thus, a data management and distribution system has been described that includes router processes for controlling data communications between application processes running on computers connected by a network. Preferably, a router process runs on each computer, with the application processes running on the computer connected directly to the router process. As a result, all interprocess communications must pass through these routers. Each router process includes a connection table listing its connections with all other router and application processes, as well as an interest table listing the type of objects that each of the other processes are interested in receiving. Data communication is accomplished by an application process providing an object to its local router, which then distributes the object to all other interested routers. The object includes a destination list indicating which processes are to receive the object. Thus, with the use of routers, application processes that need to communicate with each other over a network need not know the intricate details (such as the communications protocol used, the exact address of the receiving process, etc.) involved in transmitting information. By placing the burden of managing the network communications on the local routers, the complexity of the application code is reduced since it has only a single connection to its local router. Another advantage is that, since each local router is aware of each other's interests, a virtual fully-connected network is available while avoiding the complexities of such a fully-connected network. A further advantage is that what is defined as a client or a server can change dynamically, whereas in prior designs, the client and server components must be defined early in the design process. Yet another advantage is that the routers can be used with different operating systems and communications protocols, thereby allowing it to be used in a heterogeneous network. Yet a further advantage is that in the case of a bridge connection, no transmission of a data object need be done over the bridge connection if an interest has not been registered across the bridge of that data object. This helps in reducing the traffic over the bridge, which is typically a relatively slow long distance connection.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer-readable storage medium comprising program instructions for managing and distributing data objects of different types between a plurality of child processes running on a plurality of computers connected to a network, wherein said data objects each include data and properties associated with said data, wherein at least a subset of said properties are usable to indicate the types of data objects, wherein a child process runs on each of the plurality of the computers, and wherein a router process runs on each of the plurality of computers, each router process acting as an interface between its respective child process and the other router processes, wherein said program instructions are operable to implement the steps of:

each router process storing connection information in a table for indicating how the router process is connected to its respective child process and to the other router processes;

each router process storing interest information in a table for indicating the types of data objects its respective child process and the other router processes are interested in, wherein said interest information comprises one or more values of one or more of said properties of said data objects;

a first router process building a destination list based on said interest information and connection information stored in its respective tables in response to its respective child process transmitting a data object of a first type, said destination list specifying which other router processes are to receive said data object;

said first router process modifying said data object by adding said destination list to said data object; and said first router process distributing said modified data object to the other router processes according to said destination list.

2. The computer-readable storage medium of claim 1, wherein one of the plurality of computers further includes an additional child process, and wherein the router process running on said one of the computers acts as an interface between its respective child processes.

3. The computer-readable storage medium of claim 1, wherein said program instructions are further operable to implement the step of:

a second router process receiving said modified data object from said first router process, said second router process being on said destination list;

said second router process accessing said interest information in its respective interest table;

said second router process determining from said interest information if the respective child process of said second router process is interested in said first type of data object; and said second router process forwarding said data object to its respective child process if said child process is interested in said first type of data object.

4. The computer-readable storage medium of claim 3, wherein at least one of said plurality of child processes is an application process.

5. The computer-readable storage medium of claim 3, wherein a first additional computer is connected to the network, wherein a third router process and a third child process runs on said first additional computer, wherein said third router process is configurable as a child process with respect to said first router process such that said first router process acts as an interface between said third router process and other router processes, and wherein said third router process acts as an interface between said third child process and said first router process.

6. The computer-readable storage medium of claim 5, wherein a second additional computer is connected to the network, wherein a fourth router process and a fourth child process runs on said second additional computer, said fourth router process acting as an interface between said fourth child process and said third router process, and wherein said third router process further acts as an interface between said third child process and said fourth router process.

7. The computer-readable storage medium of claim 3, wherein an additional computer is connected to the network, wherein a child process runs on said additional computer, and wherein one of the plurality of said router processes acts as an interface between said child process on said additional computer and the other router processes.

8. The computer-readable storage medium of claim 3, wherein said program instructions are further operable to implement the step of:

said second router process forwarding said modified data object to other processes according to said destination list.

9. The computer-readable storage medium of claim 8, wherein certain of the plurality of computers are connected directly through the network and certain others of the plurality of computers are indirectly connected through the network, said indirectly connected computers being connected through one or more of the other computers, and wherein said step of said first router process distributing said modified data object to the other router processes includes:

said first router process distributing said modified data object to a router process running on computers that are directly connected; and said first router process removing said directly connected router process from said destination list as said modified data object is distributed.

10. The computer-readable storage medium of claim 3, wherein said interest information of each router process includes a local portion and a remote portion, wherein said remote portion indicates the types of data objects the respective child process and the other router processes are interested in, and wherein said local portion indicates the types of data objects each router process is interested in, wherein said program instructions are further operable to implement the steps of:

said second router process determining if said interest information accessed from said interest table is local;

said second router process determining whether said local interest information indicates an interest in said type of data object if said accessed information is local; and said second router process invoking a subroutine for performing predetermined functions if interest in said type of data object is indicated by said local interest information.

11. The computer-readable storage medium of claim 3, wherein each data object includes at least one of a plurality of properties, wherein each interest table includes a list of interests each having a plurality of properties and each having an identifier, each of said identifiers corresponding to a portion of said connection information, said portion of said connection information specifying if the interest is associated with a child process or with one of the other router processes, and wherein said step of said second router process determining if its respective child process is interested in said type of data object includes the steps of:

comparing said plurality of properties in said received data object with said plurality of properties in each of said interests in said interest table corresponding to said second router process to determine which of said interests has matching properties; and retrieving said identifier from said interest having matching properties.

12. The computer-readable storage medium of claim 11, wherein said plurality of properties includes an address property.

13. The computer-readable storage medium of claim 12, wherein said address property includes a map and a plurality of domains, said map defining a particular addressing scheme, each of said domains defining a boundary within said map, each of said domains including at least one child process.

14. The computer-readable storage medium of claim 13, wherein at least one of said plurality of domains includes a subdomain, said subdomain further defining a more specific boundary in said map.

15. The computer-readable storage medium of claim 14, wherein said map is a physical map, and wherein a domain and subdomain in said physical map defines one of said child and router processes.

16. The computer-readable storage medium of claim 3 wherein a child process indicates its interest in any of the different types of data objects by transmitting a first interest object, said first interest object containing information indicating the type of data object that said child process is interested in, wherein said program instructions are further operable to implement the steps of:

said first router process receiving said first interest object when its respective child process transmits said first interest object;

said first router process updating said interest information in its respective interest table with said first interest object information;

said first router process distributing said first interest object to certain other router processes;

said certain other router processes receiving said first interest object when said first interest object is distributed by said first router process; and said certain of said other router processes updating said interest information in their respective interest tables with said first interest object information.

17. The computer-readable storage medium of claim 16, wherein said first router process has an address, wherein said child process associated with said first router process has an address, wherein said first interest object includes a source address portion, wherein said source address portion in said first interest object transmitted by said child process includes said child process address, wherein said program instructions are further operable to implement the steps of:

said first router process modifying said first interest object by substituting said first router process address for said child process address in said source address portion.

18. The computer-readable storage medium of claim 16, wherein said program instructions are further operable to implement the steps of:

each of said router processes distributing a second interest object to another router process containing information indicating an interest in an interest object of said other router process; and said other router process updating said interest information in its respective interest table with said second interest object information, wherein said certain other router processes receiving said first interest object are those router processes that have distributed said second interest object to said first router process.

19. The computer-readable storage medium of claim 3 wherein said program instructions are further operable to implement the steps of:

said first router process distributing a first interest object to certain other router processes to indicate interest in a type of data object, said first interest object containing information indicating the type of data object that said first router process is interested in;

said certain other router processes receiving said first interest object when said first interest object is distributed; and said certain other router processes updating said interest information in their respective interest tables with said first interest object information.

20. The computer-readable storage medium of claim 19, wherein said program instructions are further operable to implement the steps of:

each of said router processes distributing a second interest object to another router process containing information indicating an interest in an interest object of said other router process; and said other router process updating said interest information in its respective interest table with said second interest object information, wherein said certain other router processes receiving said first interest objects are those processes that have distributed said second interest object to said first router process.

21. The computer-readable storage medium of claim 20, wherein an additional computer is connected to the network, wherein a third router process and a third child process runs on said additional computer, wherein said third router process is configured as a child process with respect to said first router process such that said first router process acts as an interface between said third router process and other router processes and wherein said third process acts as an interface between said third child process and said first router process, wherein said program instructions are further operable to implement the steps of:

said third router process distributing said second interest object to said first router process; and said first router process distributing said first interest object to said third router process if said third router process has distributed said second interest object to said first router process.

22. The computer-readable storage medium of claim 3, wherein a child process transmits a child startup object when said child process starts up, said child startup object containing information about said child process, wherein said program instructions are further operable to implement the steps of:

said first router process receiving said child startup object when its respective child process starts up; and said first router process updating said connection information in its respective connection table with said child startup object information.

23. The computer-readable storage medium of claim 3, wherein said program instructions are further operable to implement the steps of:

said first router process distributing a router startup object to certain other router processes when said first router process starts up, said router startup object containing information about said first router process;

said certain other router processes receiving said router startup object; and said certain router processes updating said connection information in its respective connection table with said router startup object information.

24. The computer-readable storage medium of claim 23, wherein said program instructions are further operable to implement the steps of:

each of said certain router processes distributing an interest object to said first router process in response to receipt of said startup object, information in said interest object from each of said certain router processes indicating that said certain router processes are interested in obtaining an interest object from said first router process;

said first router process receiving said interest objects sent by said certain router processes; and said first router process updating said interest information in its respective interest table with information in said interest objects distributed by said certain other outer processes.

25. The computer-readable storage medium of claim 3, wherein said program instructions are further operable to implement the steps of:

said first router process distributing a connection object to another router process periodically to check the connection between the computer on which said first router process is running and the computer on which said other router process is running; and said first router process setting an internal flag if said other router does not respond within a predetermined amount of time.

26. The computer-readable storage medium of claim 25, wherein said program instructions are further operable to implement the steps of:

said first router process modifying said interest information in its respective interest table to remove any interests in said other router if said internal flag is set; and said first router process modifying said connection information in its respective connection table to remove a portion of said connection information associated with said other router process if said internal flag is set.

27. The computer-readable storage medium of claim 3, wherein the network includes a plurality of connections between the plurality of computers, and wherein each of said connections can be according to any one of a plurality of network protocols.

28. The computer-readable storage medium of claim 3, wherein an operating system runs on each of the plurality of computers, and wherein said operating system can be any one of a plurality of types of operating systems.

29. The computer-readable storage medium of claim 1, wherein the storage medium comprises an installation medium, wherein said program instructions are included on said installation medium for installation on one or more of said plurality of computers connected to the network.

30. The computer-readable storage medium of claim 1, wherein the storage medium comprises a system memory in each of said plurality of computers connected to the network, wherein said program instructions are included in said system memory.

31. A computer network, comprising:

a communications network; and a plurality of computer systems coupled to the communications network, wherein each of said plurality of computer systems comprises:

a child process running on each of the plurality of computers; and a router process running on each of the plurality of computers, each router process acting as an interface between its respective child process and the other router processes, wherein said router process is operable to route data objects of different types between said plurality of child processes, wherein said data objects each include data and properties associated with said data, wherein at least a subset of said properties are usable to indicate the types of data objects;

wherein each router process is operable to store connection information in a table for indicating how the router process is connected to its respective child process and to the other router processes;

wherein each router process is operable to store interest information in a table for indicating the types of data objects its respective child process and the other router processes are interested in, wherein said interest information comprises one or more values of one or more of said properties of said data objects;

wherein a first router process running on one of said plurality of computer systems is operable to build a destination list based on said interest information and connection information stored in its respective tables in response to its respective child process transmitting a data object of a first type, said destination list specifying which other router processes are to receive said data object, wherein said first router process is operable to modify said data object by adding said destination list to said data object; and wherein said first router process is operable to distribute said modified data object to the other router processes according to said destination list.

32. The network of claim 31, wherein a second router process running on one of said plurality of computer systems is operable to receive said modified data object from said first router process, said second router process being on said destination list;

wherein said second router process is operable to access said interest information in its respective interest table;

wherein said second router process is operable to determine from said interest information if the respective child process of said second router process is interested in said first type of data object; and wherein said second router process is operable to forward said data object to its respective child process if said child process is interested in said first type of data object.

33. The network of claim 32, further comprising a first additional computer connected to the network, wherein a third router process and a third child process runs on said first additional computer, wherein said third router process is configurable as a child process with respect to said first router process such that said first router process acts as an interface between said third router process and other router processes, and wherein said third router process acts as an interface between said third child process and said first router process.

34. The network of claim 32, wherein said second router process is operable to forward said modified data object to other processes according to said destination list.

35. The network of claim 32, wherein each data object includes at least one of a plurality of properties, wherein each interest table includes a list of interests each having a plurality of properties and each having an identifier, each of said identifiers corresponding to a portion of said connection information, said portion of said connection information specifying if the interest is associated with a child process or with one of the other router processes, and wherein said second router process is operable to determine if its respective child process is interested in said type of data object by comparing said plurality of properties in said received data object with said plurality of properties in each of said interests in said interest table corresponding to said second router process to determine which of said interests has matching properties, and retrieving said identifier from said interest having matching properties.

36. The network of claim 32, wherein a child process indicates its interest in any of the different types of data objects by transmitting a first interest object, said first interest object containing information indicating the type of data object that said child process is interested in;

wherein said first router process is operable to receive said first interest object when its respective child process transmits said first interest object;

wherein said first router process is operable to update said interest information in its respective interest table with said first interest object information;

wherein said first router process is operable to distribute said first interest object to certain other router processes;

wherein said certain other router processes are operable to receive said first interest object when said first interest object is distributed by said first router process; and wherein said certain of said other router processes are operable to update said interest information in their respective interest tables with said first interest object information.

37. The network of claim 32, wherein said first router process is operable to distribute a first interest object to certain other router processes to indicate interest in a type of data object, said first interest object containing information indicating the type of data object that said first router process is interested in;

wherein said certain other router processes are operable to receive said first interest object when said first interest object is distributed; and wherein said certain other router processes are operable to update said interest information in their respective interest tables with said first interest object information.

38. The network of claim 37, wherein each of said router processes is operable to distribute a second interest object to another router process containing information indicating an interest in an interest object of said other router process; and wherein said other router process is operable to update said interest information in its respective interest table with said second interest object information, wherein said certain other router processes receiving said first interest objects are those processes that have distributed said second interest object to said first router process.

39. The network of claim 32, wherein a child process is operable to transmit a child startup object when said child process starts up, said child startup object containing information about said child process;

wherein said first router process is operable to receive said child startup object when its respective child process starts up; and wherein said first router process is operable to update said connection information in its respective connection table with said child startup object information.

40. The network of claim 32, wherein said first router process is operable to distribute a router startup object to certain other router processes when said first router process starts up, said router startup object containing information about said first router process;

wherein said certain other router processes are operable to receive said router startup object; and wherein said certain router processes are operable to update said connection information in its respective connection table with said router startup object information.

41. The network of claim 40, wherein each of said certain router processes is operable to distribute an interest object to said first router process in response to receipt of said startup object, information in said interest object from each of said certain router processes indicating that said certain router processes are interested in obtaining an interest object from said first router process;

wherein said first router process is operable to receive said interest objects sent by said certain router processes; and wherein said first router process is operable to update said interest information in its respective interest table with information in said interest objects distributed by said certain other outer processes.

42. The network of claim 32, wherein said first router process is operable to distribute a connection object to another router process periodically to check the connection between the computer on which said first router process is running and the computer on which said other router process is running; and wherein said first router process is operable to set an internal flag if said other router does not respond within a predetermined amount of time.

43. The network of claim 32, wherein the network includes a plurality of connections between the plurality of computers, and wherein each of said connections can be according to any one of a plurality of network protocols.

44. The network of claim 32, wherein an operating system runs on each of the plurality of computers, and wherein said operating system can be any one of a plurality of types of operating systems.

* * * * *